FELIX FLORET
SERGE MIKAILOFF
GEORGES PERONNEAU
INVENTOR

Karl F. Ross
Attorney

Sept. 9, 1969      F. FLORET ETAL      3,466,608
DIGITAL-CODE-EXTRACTOR SYSTEM
Filed Oct. 20, 1965      13 Sheets-Sheet 3
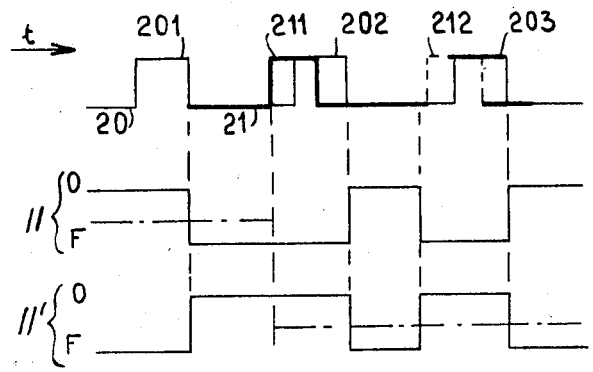
Fig 2d
Fig 3a
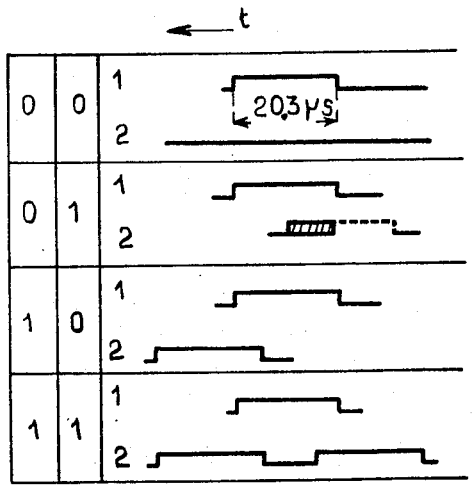
FELIX FLORET
SERGE MIKAILOFF
GEORGES PERONNEAU
INVENTOR
Karl G. Ross
Attorney

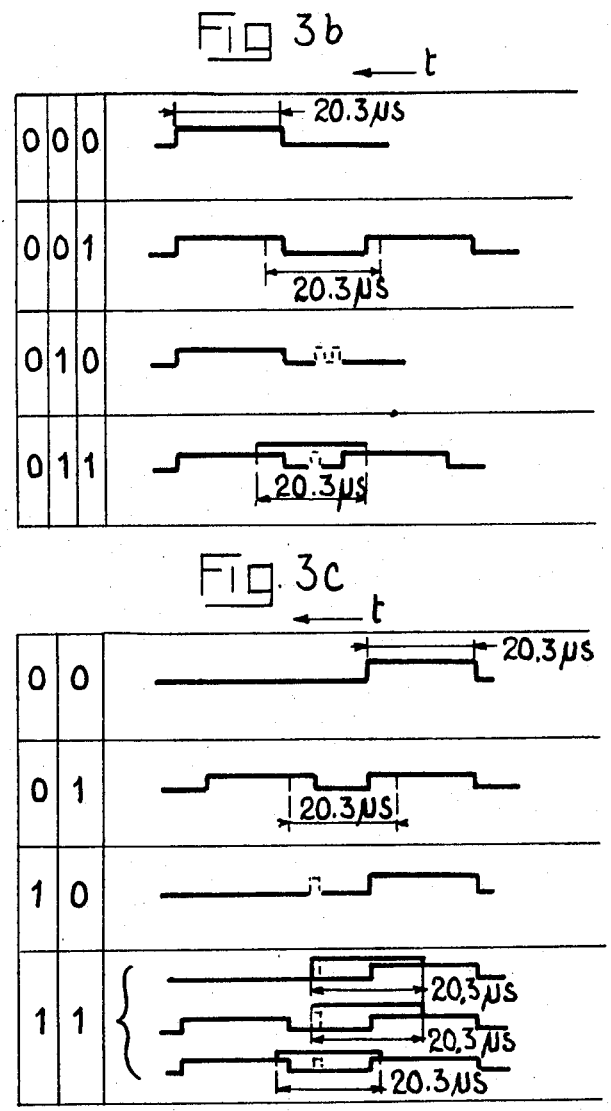

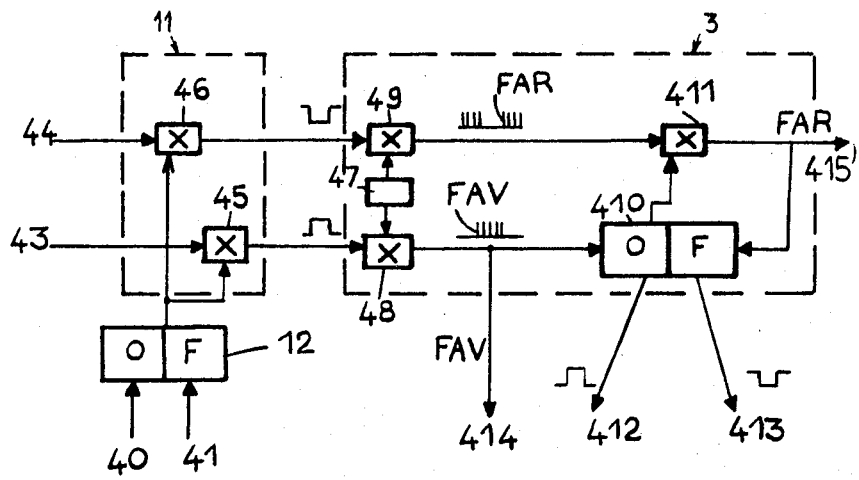
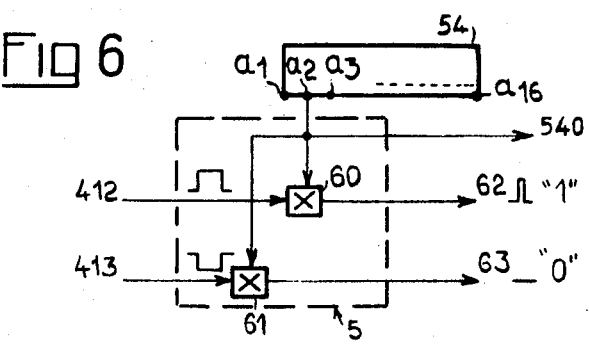

FELIX FLORET
SERGE MIKAILOFF
GEORGES PERONNEAU
INVENTOR
Karl G. Ross
Attorney

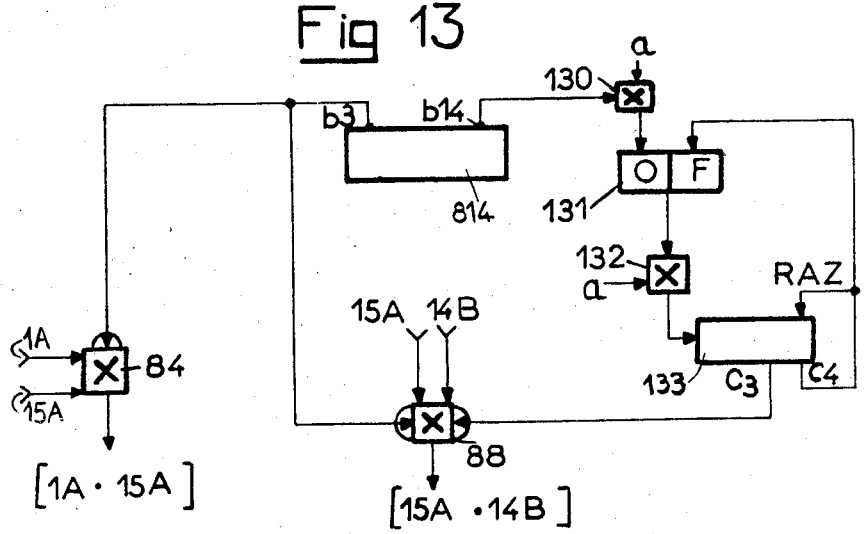
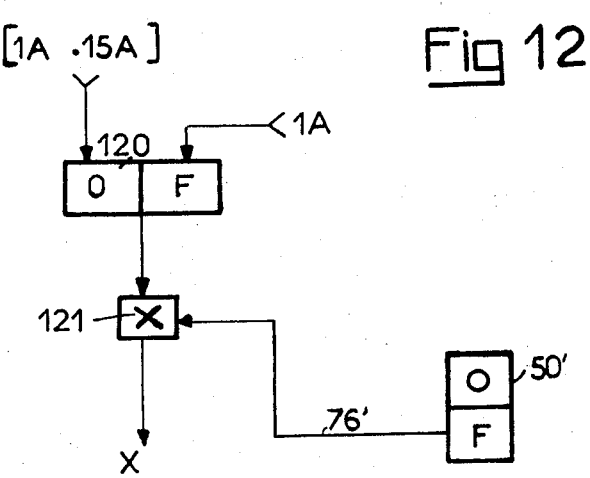

United States Patent Office 3,466,608
Patented Sept. 9, 1969

3,466,608
DIGITAL-CODE-EXTRACTOR SYSTEM
Félix Floret, Sainte-Geneviève-des-Bois, Serge Mikailoff, Paris, and Georges Peronneau, La Celle-Saint-Cloud, France, assignors to Thomson Informatique & Visualisation T.I.V., Paris, France, a corporation of France
Filed Oct. 20, 1965, Ser. No. 498,829
Claims priority, application France, Nov. 5, 1964, 993,901
Int. Cl. H04q 3/02
U.S. Cl. 340—167          18 Claims

ABSTRACT OF THE DISCLOSURE

A digital-code extractor used in a secondary radar system has two parallel channels to which incoming code pulses may be selectively directed. Pulses found to belong to the same code group, and therefore presumed to originate with a single aircraft transponder, are processed in the first channel while other pulses, found to be unrelated to that code group and therefore presumably originating with another transponder, are directed into the second channel if occurring in interleaved relationship with the first code group or immediately after termination but prior to complete processing of the latter. If pulses from the two groups merge, the leading pulse group will still be processed while the other group is suppressed, a garbling signal being given in response to the seemingly increased pulse width.

---

This invention relates to apparatus for processing digitally coded information, and one of its broader objects is the provision of an improved code-extractor system capable of handling comparably coded replies forthcoming from different sources not in phase with one another and hence liable to interfere with one another so as to cause garbling of the replies.

The invention was developed in connection with secondary radar systems, and will accordingly be disclosed with particular reference to such systems, although it is to be understood that its range of utility is not restricted hereto by may extend to other applications in the field of digital information processing.

So-called secondary radar monitoring systems (also known as air-traffic control radar-beacon systems) have come into extensive use in recent years for controlling the heavy traffic of incoming aircraft over large airfields. Such systems serve to impart information to the ground control stations concerning each incoming craft about to land, over and above the scarce data given by the more conventional, so-called "primary" radar equipment. In a secondary radar system, the aircraft are equipped with transponders or beacons. When such an airborne transponder is illuminated by a radar beam from the ground-station interrogator, it automatically retransmits a reply in the form of a digital code train which conveys certain specific items of intelligence concerning the carrier aircraft, primarily identification, altitude and various other data. The code used in a multipositional code, and ICAO recommendations specify a twelve-position code group capable of carrying $2^{12} = 4096$ information bits. The code trains received at the ground station are passed from the receiver by way of a so-called extractor unit to a decoder unit and the decoded information is displayed and used to perform control functions. The extractor unit just referred to serves to detect and to separate useful received code responses from accompanying noise and garbling replies, and pass them in a readily usable form to the decoder unit.

It is a chief object of this invention, as applied to secondary radar systems, to provide an improved digitally-operating code extractor unit which will be substantially more effective than any heretofore available and will be capable of performing a considerably greater number of useful code-extracting functions.

Specifically, a code extractor according to this invention will act effectively to detect and to separate response code signals as received from different aircraft transponders that may happen to be simultaneously scanned by the radar beam. The improved system will discriminate between various types of signal garbling situations, as later specified, and will succeed in extracting useful (i.e. correctly decodable) code signals from the midst of other, garbling, signals in a number of situations which were heretofore considered hopeless when applied to conventional code extractors. The system will, further, deliver to the decoder unit associated with it a signal indicating whether or not the current code signal is garbled, and if so what specific type of garbling is involved.

An exemplary embodiment of the invention, as applied to a secondary radar extractor unit capable of handling many-position codes of the kind specified by current aircraft regulations, will now be disclosed by way of illustration but not of limitation with reference to the accompanying diagrammatic drawing wherein:

FIGS. 2a, 2b, 2c and 2d are timing charts serving to explain the so-called "priority" mode of operation of the video-pulse input gates, respectively in the case of a single-response code group, two code groups in interleaved relation, two code groups in phase-garbling relation with the earlier code group leading, and two code groups in phase-garbling relation with the earlier code lagging;

FIGS. 3a, 3b and 3c are charts used in explaining the operation of the system during the first stage of the second investigation step, the second stage of the second investigation step, and the third investigation step, respectively;

FIG. 4 is a logical diagram of the video gate circuit and pulse-width gauge and regenerator circuits;

Figure 5:
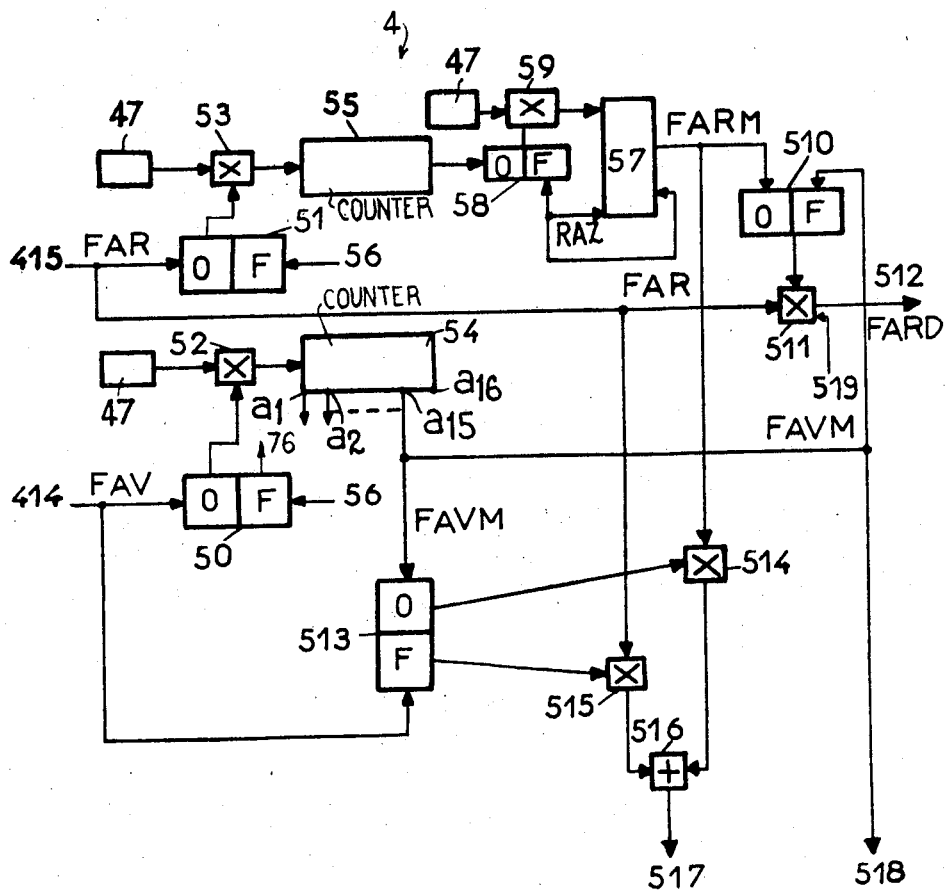
Figure 7:
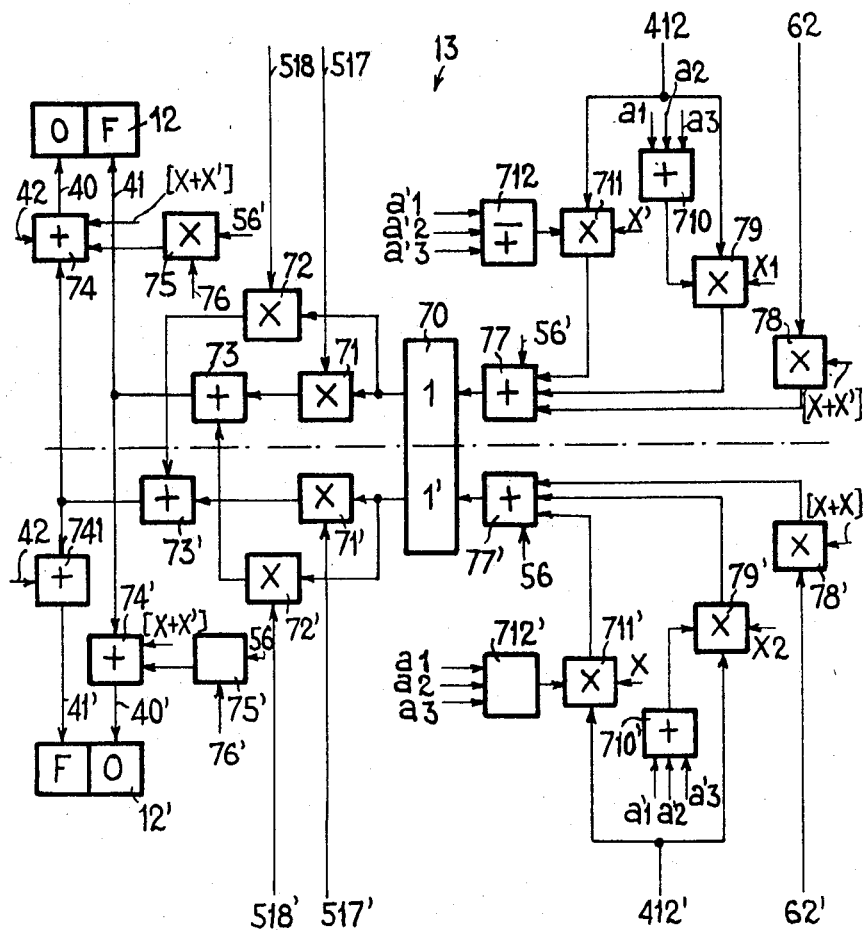
Figure 8:
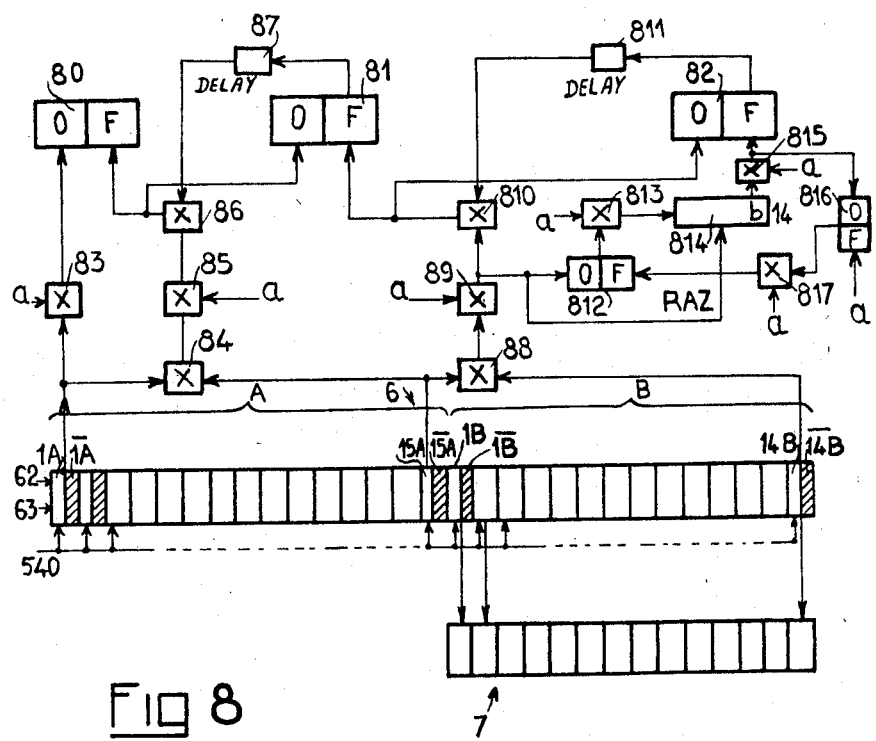
Figure 9:
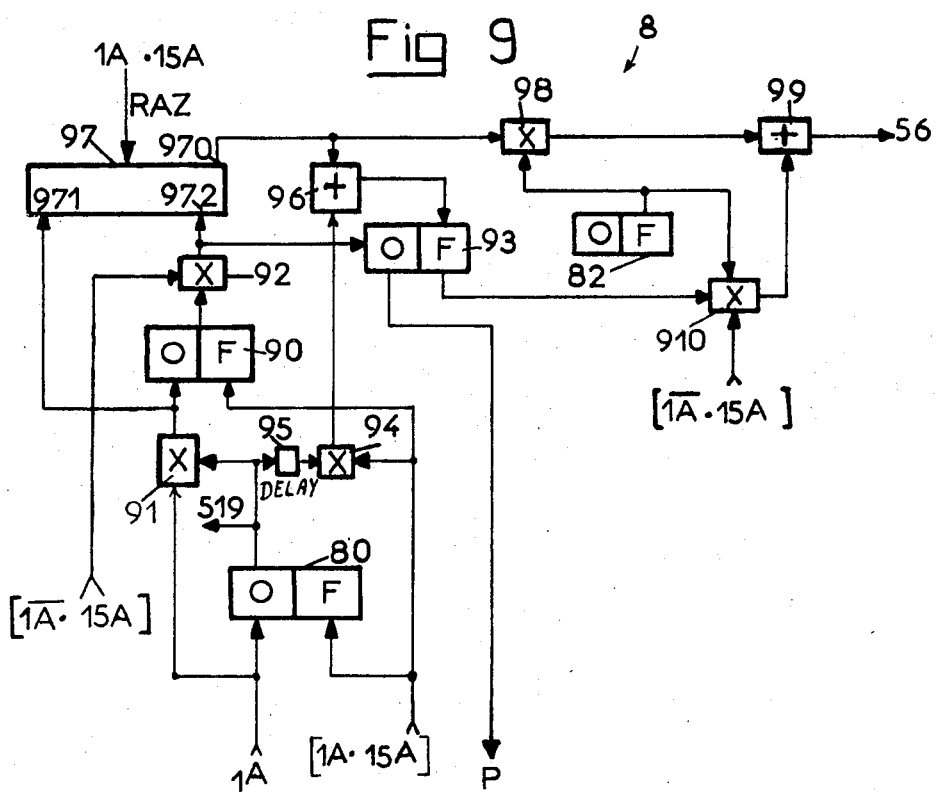
Figure 10:
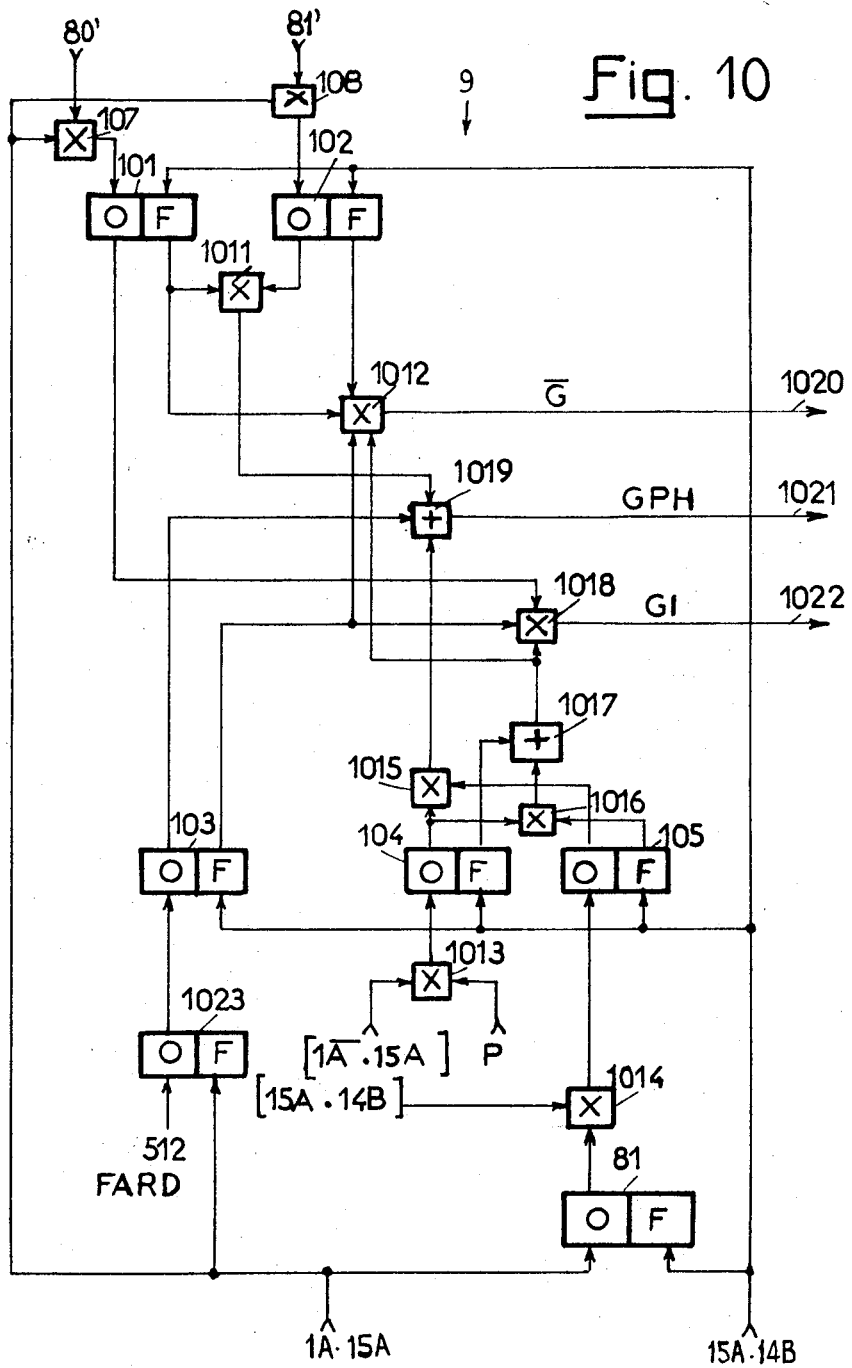
Figure 11:
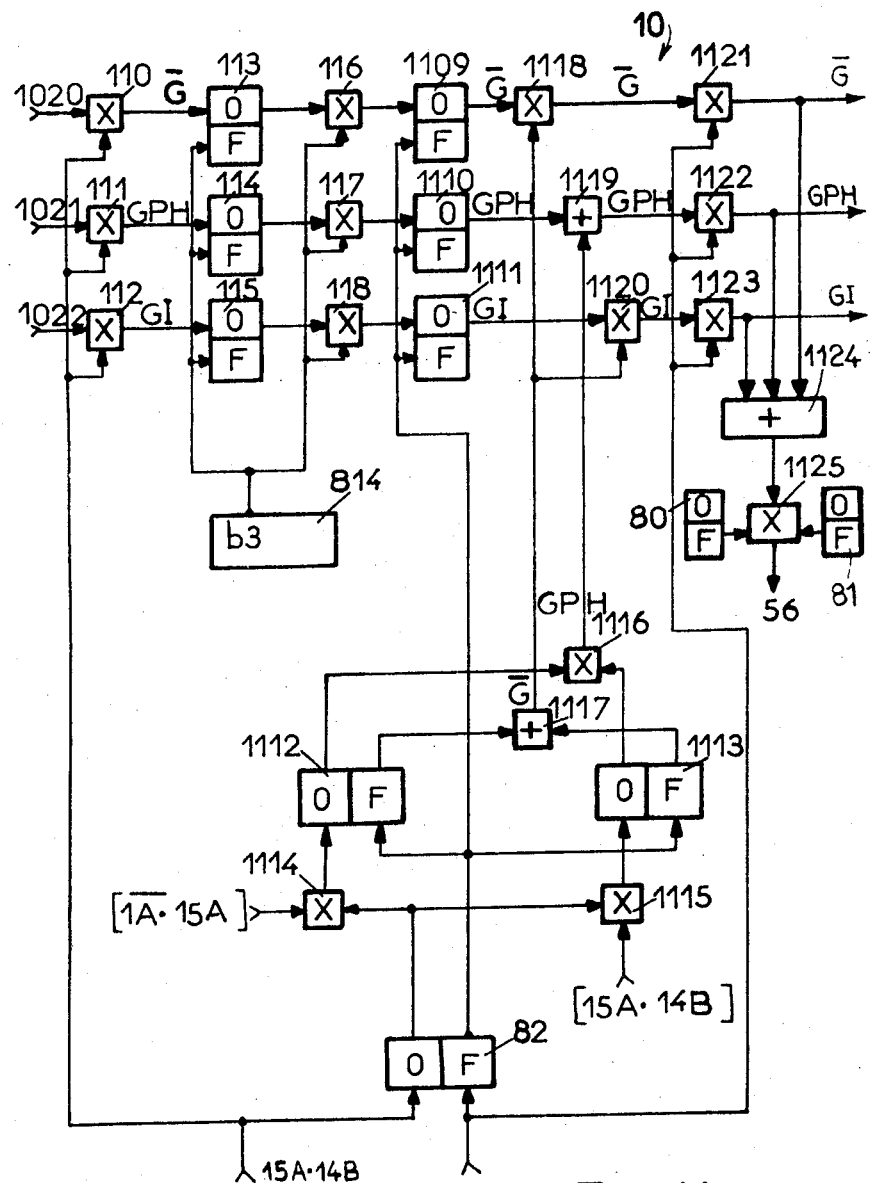
Figure 14:
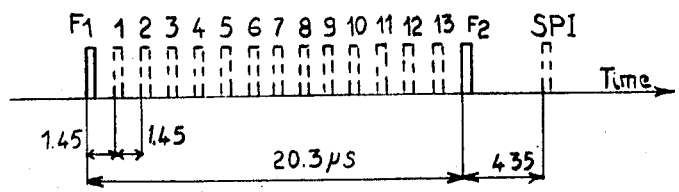
Figure 15:
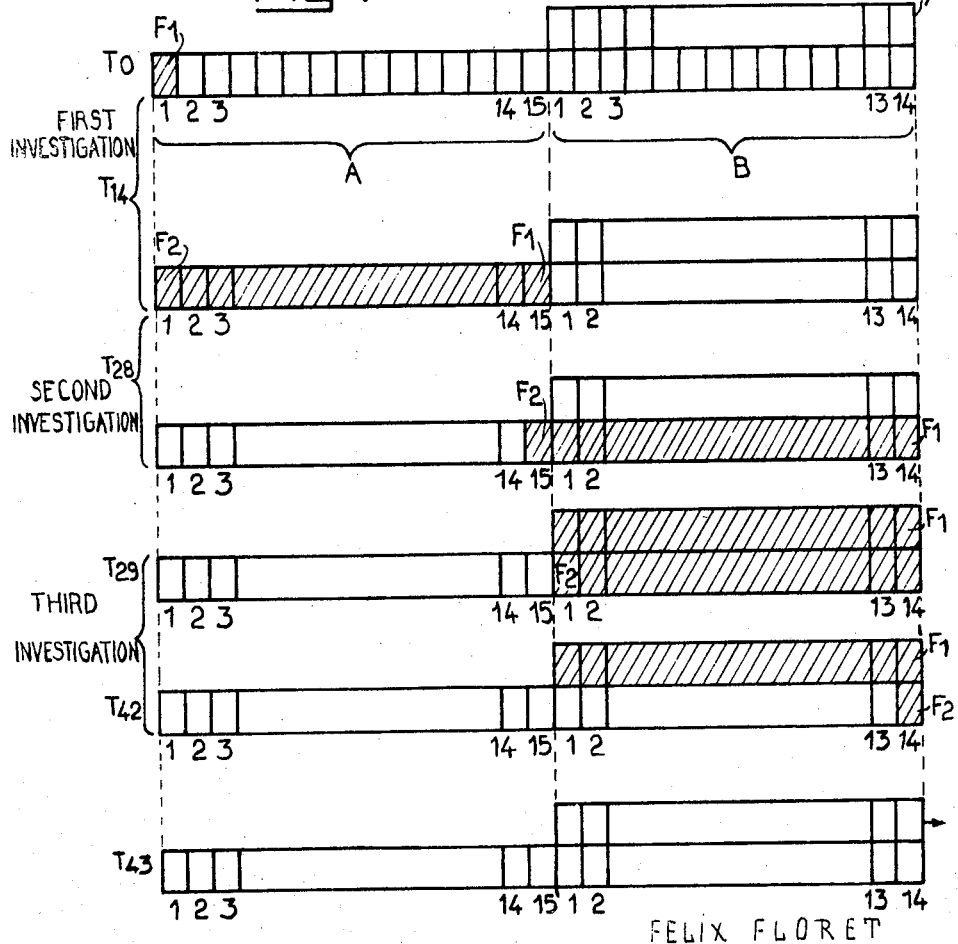

FIG. 5 similarly shows the pulse-phase-and-width memory circuit;

FIG. 6 shows the pulse-phase-testing circuit;

FIG. 7 shows the input-gate-control circuit;

FIG. 8 shows the shift registers and investigation logical control circuits;

FIG. 9 shows the first investigation circuit;

FIG. 10 shows the second investigation circuit;

FIG. 11 shows the third investigation circuit;

FIG. 12 shows a circuit for sensing so-called X-situations;

FIG. 13 shows an optional circuit for preventing interference from SPI pulses;

FIG. 14 is a time chart of a standard radar response-code group or train, as specified by aircraft regulations currently in force (ICAO recommendations); and FIG. 15 illustrates the positions assumed by an incoming code group in the registers of a channel of the system, at different time periods during a processing cycle.

The response-code group and garble configurations (FIG. 14)

A standard aircraft transponder signal or puse code group as specified by International Civil Aircraft Organization (ICAO) regulations currently in force is illustrated in FIG. 14. It essentially comprises fifteen pulse positions spaced at 1.45 μs. intervals and thus $1.45 \times 14 = 20.3$ μs. long. The two end pulses designated F1 and F2 are always present and are known as the framing or bracket pulses. Intermediate pulse positions are filled or are vacant as required by the coded information to be conveyed, with the 13th position always being blank, however. Thus the total number of possible codes is seen to be $2^{12}=4096$. The pulse width may vary as from one transponder to another within the range 0.35 to 0.55 and up to 0.70–0.80 μs. Positioned three pulse periods, i.e. 4.35 μs., beyond the end framing pulse F2 there may be a so-called "special pulse indentification" or SPI introducible manually by the aircraft operator. In the embodiment of the invention to be disclosed, this SPI pulse is mainly disregarded and the code group is processed as a group of fifteen pulses 20.3 μs. in total length. Means will be disclosed herein whereby the presence of the SPI pulse will not interfere with the operation of the system. The invention, however, can also be embodied in a system capable of handling code groups 24.65 μs. long so as to take the SPI pulses completely into account. The permitted tolerance in respect to the timing of each pulse relatively to the F1 leading edge is ±0.1 μs.

An aircraft transponder on being interrogated by means of radar signals from the ground station responds by transmitting a train of similar such code groups all in phase, spaced at the PRF rate. As the radar beam scans a section of the sky it will receive responses from the transponder of any aircraft present. Depending on the relative distance of the aircraft from the radar station the the responses from them may be received at the station separately or in overlapping relation. In the latter case garbling is present.

The code signals received by the radar receiver are transferred by way of a so-called extractor device to a decoder unit in which the code information is decoded and converted to usable form, i.e. displayed and/or used for various control functions. The present embodiment of the invention is an improved extractor unit which functions (1) to detect and extract code groups and transfer them to the decoder in separate and hence usable form even when the code groups are received in certain garbled configurations, and simultaneously (2) to transmit to the decoder unit an information specifying whether or not the code groups thus transferred are garbled and, if so, what variety of garbling is involved.

More specifically, two code groups of the type shown in FIG. 14 are considered to be separately received if the leading edge of the F1 pulse of a second-received group follows by at least 0.25 μs. the trailing edge of the F2 pulse of the pulse group ahead of it, since in these conditions the two code groups can be handled separately by the decoder unit in a satisfactory manner. The extractor of the invention then transmits to the decoder, together with each code group, a "non-garble" signal designated herein $\overline{G}$.

When two received code groups overlap in whole or in part, so that garbling is present, various configurations are possible. In one configuration, the relative phasing between the code groups is such that the pulse positions of the respective groups are interspersed but remain distinctly separate from one another. The code groups are then said to be interleaved. In this situation the system of the invention discriminates between the interleaved code pulses and delivers the two complete code groups separately to the decoder, at the same time issuing an "interleaved garbling" signal herein designated GI.

When the relative phasing of the overlapping code groups is such that the pulse positions of the respective groups themselves overlap, and the respective pulses therefore fuse so to speak, the condition is termed "phase garbling." The disclosed system is then able to extract only one of the two code groups in useful form (specifically the one in phase-leading relation), and simultaneously delivers to the decoder a signal indicative of the phase-garbled condition, which signal is herein designated GPH.

Figure 1:
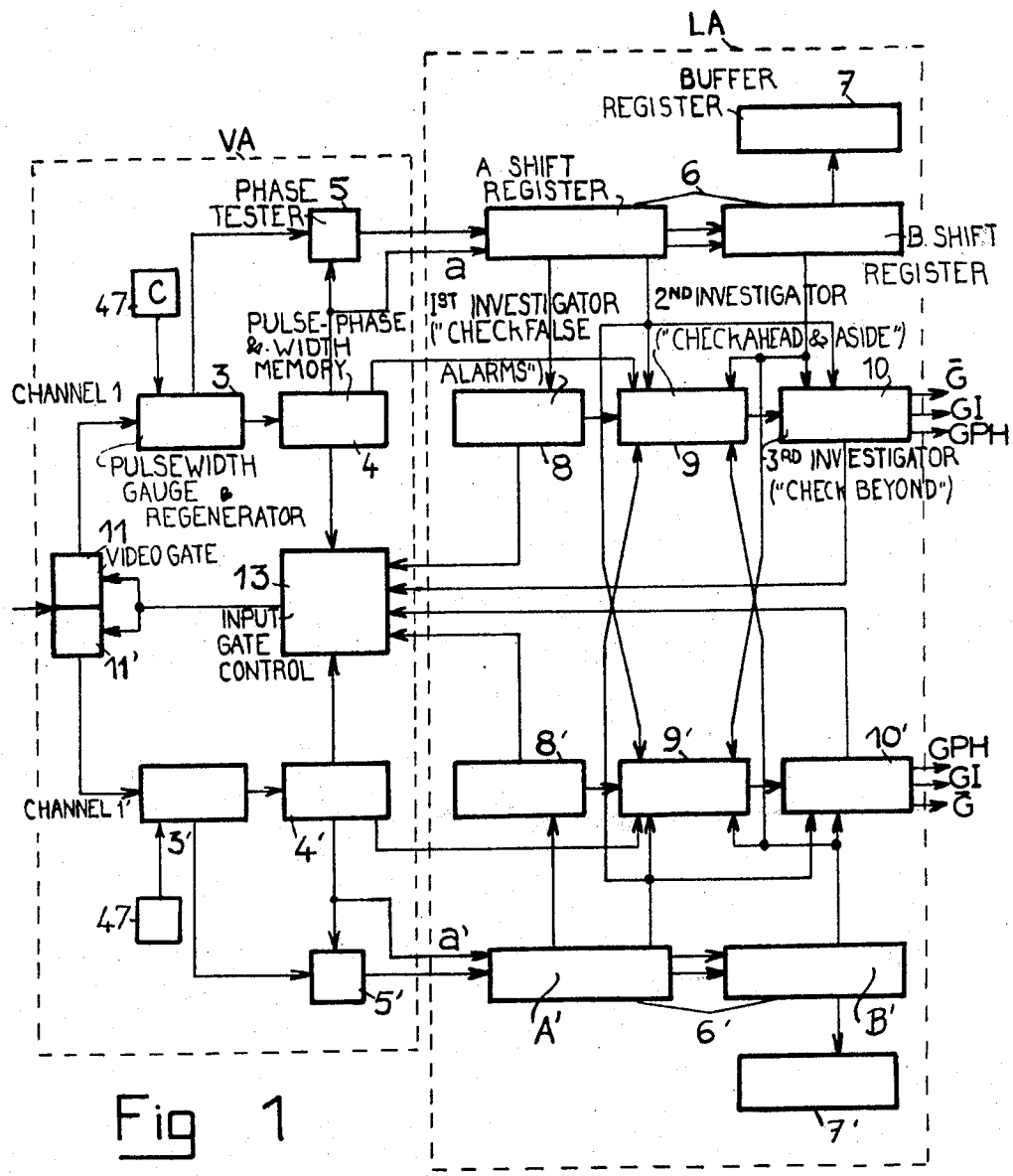
FIG. 1 is a functional block diagram of the entire system.

Brief system description (FIG. 1)

The system is seen to include two units in series, a Video Analyzer unit VA and a Logical Analyzer unit LA. Also, the system includes within each unit two signal channels in parallel, 1 and 1'. The two channels are identical and symmetrically arranged, and corresponding components therein are designated with the same references, those relating to channel 1' being primed.

An essential function of video analyzer unit VA is to direct a first initial video pulse applied to the system input as well as any subsequent applied pulses in phase with said first initial pulse into one channel, e.g. 1, and direct a second initial video pulse applied to the input not in phase with said first initial pulse, as well as any subsequent applied pulses in phase with said second initial pulse, into the other channel, e.g. 1'. In this way pulse code groups constituting responses from different aircraft transponders, as evidenced by their out-of-phase relation, are segregated between the two channels. Interleaved garbling and to a large extent phase garbling, if either is present, are thus effectively dealt with.

Unit VA consists of the following chief components in each channel:

In Input Gate circuit 11 (or 11').—This circuit passes the video pulse into the channel.

A Pulsewidth Gauging and Regenerating circuit 3 (3').—This circuit gauges the leading and trailing edges of each incoming pulse from input gate 11 by reference to fine, accurately timed clock spike pulses from a clockpulse generator 47 (common to both channels) and derives therefrom a leading-edge spike pulse (called FAV herein for the French phrase "Front Avant") and a trailing edge spike pulse (called FAR for the French "Front Arrière"), which correspond in position to but are more precisely defined than the actual leading and trailing edges of the incoming pulse. Circuit 3 thus accurately gauges the pulsewidth of the incoming pulse and also produces a regenerated pulse corresponding in phasing and width to, but more accurately defined than, said incoming pulse.

A Pulse-Phase-and-Width Memory circuit 4 (4').—This circuit receives from the preceding circuit 3 the leading-edge and trailing-edge spike pulses FAV and FAR relating to an initial pulse applied to the channel and develops therefrom respective "memory" trains of fine spike pulses, all in phase with the initial spike pulses FAV and FAR respectively. Thus the spike pulses of the first memory train, herein called FAVM (for "Front Avant Mémorisé"), serve to memorize the phase condition of the leading edge of the initially received pulse, while the spike pulses of the second train, called FARM (for "Front Arrière Mémorisé"), similarly memorize the phase condition of the trailing edge of said initial pulse. Circuit 4 thus also memorizes the pulsewidth of said initially received pulse, and is hence able to sense whenever a subsequent pulse applied to the channel is of abnormally great width, as indicated by a substantial time lag in its trailing-edge spike pulse FAR over a memorized trailing-edge spike pulse FARM. In such case circuit 4 produces a signal indicative of a "displaced trailing edge," which signal is called FARD ("Front Arrière Déplacé").

A Phase Testing (or Sampling) circuit 5 (5').—This circuit receives regenerated input pulses from circuit 3 and memorized leading-edge (FAVM) spike pulses from circuit 4, and compares the phasing of the actual leading edge of the incoming pulse with the memorized leading edge of the initial pulse. If the two are substantially in-phase, the circuit effectively passes the incoming pulse into the shift register section A (later described) of the corresponding channel of the Logical Analyzer unit LA.

Video analyser unit VA also includes:

A Gate Control circuit 13, which is common to both channels 1 and 1'.—This circuit controls the opening and closure of the video input gates 11 and 11' so as to accomplish the desired segregation of out-of-phase pulse codes between the two channels as said above. This circuit is operated under control of the FAVM, FARM and FAR pulses from circuit 4 and of certain logical situations sensed in the logical analyzer unit LA as will be disclosed.

The Logical Analyzer unit LA, in each channel, comprises:

A Digital Shift Register 6 (or 6'), consisting of two serially connected sections A and B.—Each section substantially corresponds in capacity, i.e. number of stages, with the effective length of a pulse code group; more precisely section A has fifteen stages and section B fourteen stages. A code pulse passed by Phase Tester circuit 5 enters the initial stage of section A, and is then stepped through the entire register 6 by means of shift pulses $a$ derived from the pulse memory circuit 4. The shift pulses $a$ are substantially synchronous with the leading-edge memory spike pulses FAVM. Hence the code pulses are all stepped through the stages of register 6 in phase with the initial pulse of a code group.

A buffer register 7 (7'), fourteen stages in capacity.— This register is arranged to have a code-pulse group transferred in parallel into it from shift-register section B so as to store the code group for an additional period while its code pulses are being subjected to the Third Investigation presently referred to. From the buffer register 7, the fully investigated code group is transferred (serially or in parallel) to a decoder unit, not shown.

Three Investigator circuits 8, 9, 10 (8', 9', 10').— These are three logical circuits which include coincidence gates connected to particular pairs of stages of the shift-register sections A and B so as to sense the coincidential occurrence of pulses in said stages. From this and other information presently specified, the Investigator circuits draw conclusions as to the non-garbled, interleaved or phase-garbled condition of the code group under investigation, and accordingly issue a $\overline{G}$, GI or GHP signal to the decoder.

More specifically, the First Investigator circuit 8 conducts a so-called first investigation which starts at the time a pulse enters register section A and ends when a complete code group (if any) is entered into said register section, with framing pulses F1 and F2 of such code group respectively positioned in the 15th and first register stages (hereinafter termed positions 15A and 1A). The circuit detects so-called "False-Alarm" pulses, i.e. isolated video pulses that have contrived to pass input gate 11 and phase tester 5 and which may be due to spurious video signals or phase-garbled and curtailed code groups as later described. If one or more closely consecutive false-alarm pulses are detected, the circuit emits a "Forget initial pulse" command signal after the last such false-alarm pulse has left register section A and any code pulses that may be present in section B have left that section. This "Forget" command arrests the operation of memory circuit 4 and clears the channel for the entry of subsequent video pulses not in phase with the previously memorized initial pulse.

The Second Investigator circuit 9 conducts a second investigation from the time the initial framing pulse F1 of a code group has entered the first stage (B1) of section B to the time it has reached the last stage B14 thereof. This investigation is conducted in two steps.

In a first step circuit 9 searches for code pulses in sections A' and B' of register 6' of chanel 1', i.e. the channel other than the one being considered, for possible indications of interleaved or phase-garbled conditions. In a second step, circuit 9 checks the situation ahead of the code group being investigated and for this purpose detects occurrence of simultaneous pulses in stage 15 of section A and stage 14 of section B ($15A \cdot 14B$ coincidences) at any time during the progress of the investigated code group from section A into section B. The gated code group from section A into section B. The circuit also is responsive to the earlier detection of false-alarm pulses by the first investigator circuit 8, as well as the presence of a displaced trailing-edge (FARD) pulse from memory circuit 4, and from this combined information concludes as to the possibility of a phase-garbled (GPH) situation involving an earlier-received code group.

The Third Investigator circuit 10 subjects the code group to a final investigation during the time it is moving out of register section B (after it has first been transferred into the buffer register 7). This investigation constitutes a check of the pulse situation beyond the investigated code group, wherein circuit 10 looks for the occurrence of $1A \cdot 15A$ and $15A \cdot 14B$ coincidences at any time during that period, and checks on the further possibility of a phase-garbled (GPH) situation involving a code group received after the one being investigated.

The partial conclusions reached by the First and Second Investigator circuits 9 and 10 during this respective investigations are combined into a final conclusion, issued as signal $\overline{G}$, GI or GPH by the output of each channel of the extractor system of the invention and transmitted to the decoder unit there to be exploited by means forming no part of the present invention.

The system will now be described in detail.

The video analyzer VA

Input gate circuit 11 (FIG. 4).—As shown, the video-pulse input gate in channel 1, generally designated 11 in FIG. 1, actually comprises two AND-gates 45, 46. This is because the present embodiment uses a two-line binary signal scheme in which a bit is simultaneously represented by a binary digit signal on one line and its complementary digit signal (or negate) on a companion line. Accordingly, gate 45 receives the affirmative video signal over input line 43 and gate 46 simultaneously receives the negate or complementary video signal over input line 44. Both gates 45, 46 have their second inputs supplied in common from the output of a video-gate-control binary 12. Binary 12 has setting and resetting control inputs 40, 41 extending from the Gate Control circuit 13 later described. Energization of setting control line 40 places binary 12 in one state and the consequent output condition on the binary output line opens both AND-gates 45 and 46, whereby the actual and inverted video signals are allowed to pass from lines 44, 45 to the Pulse Gauge circuit 3, as indicated by the pulseforms. Energization of resetting control line 41 places binary 12 in its other state wherin the binary output closes the AND-gates.

In the binary or flip-flop 12, as well as others described hereinafter, the letters O (from the French "ouvert"= open) and F (from the French "fermé"=closed) denote, respectively, the setting and resetting inputs and/or outputs of the flip-flop.

Pulse gauge and regenerator circuit 3 (FIG. 4).—This circuit includes a pair of AND-gates 48 and 49 which serve to quantize or accurately synchronize the input video pulses. The AND-gate 48, 49 have their first inputs connected to the respective outputs of the Video Gate circuit 11 just described and their second inputs supplied with clock pulses from clock generator 47.

It is here noted that the clock pulses produced by the generator 47 are spaced at accurately uniform intervals somewhat shorter than the maximum error tolerated for the code-pulse positions. In the exemplay embodiment, this tolerance is 0.1 µs., and the clock-pulse interval is about 0.09 µs. (more precisely 1.45/16 µs.).

The AND-gate 48, 49 are designed to deliver an output pulse during coincidence of positive voltage state applied to their inputs. Hence, during reception of a video pulse to their inputs. Hence, during reception of a video pulse gate 48 delivers a set of fine "spike" pulses as shown. The first spike of the set, termed FAV, corresponds in timing with the leading edge of the received video pulse while being accurately synchronized with a clock pulse. Similarly, gate 49 delivers a set of spike pulses at all times except during the occurrence of a video pulse, and the first spike pulse to appear after termination of a video pulse is called FAR and corresponds in timing with the trailing edge of such video pulse, while being accurately synchronized with a clock pulse.

The FAV spike pulses are applied to the setting input of a Pulse Regenerator binary 410 which, when set, applies an output to an AND-gate 411 which at its other input receives the FAR spike pulses from AND-gate 49. The FAR pulse following immediately upon a FAV pulse that has set the regenerator binary 410 is therefor passed by AND-gate 411 to reset the binary. The set output line 412 of this binary consequently delivers square pulses corresponding in phase and width to the input video pulses, and the reset output line 413 delivers square pulses corresponding to the complements or negates of said video pulses. The regenerated video pulses on lines 412, 413 have their leading and trailing edges precisely synchronous with clock pulses.

The FAR and FAV spike pulses appearing on lines 414 and 415, respectively, are utilized for further functions later described.

Pulse-phase-and-width memory circuit 4 (FIG. 5).— This circuit serves to memorize the phase condition and width of an initial video pulse applied to the channel during a processing cycle. The circuit includes two binaries 50, 51 having their setting inputs connected to the lines 414, 415 so as to be set by the FAV and FAR spike pulses, respectively. Binaries 50, 51 when set enable respective AND-gate 52, 53 to pass clock pulses from generator 47 to the inputs of respective digital counters 54, 55. The counters thereupon start to count the clock pulses passed thereto until binaries 50, 51 are reset, closing AND-gates 52, 53. The resetting of the binaries occurs only when their resetting lines 56 are energized by a "Forget Initial Pulse" command signal. This signal, as later described, terminates the processing cycle.

The counters 54, 55 have capacities such that their counting cycle equals the code-pulse-position period, herein 1.45 $\mu$s. Thus, said counters are four-stage binary counters, whereby their capacity is $2^4=16$, and their counting cycle period is $0.09 \times 16 = 1.45$ $\mu$s. as required. Each counter therefore completes a counting cycle every pulse-position period of 1.45 $\mu$s. and thereupon recommences the count. Thus it will be evident that after the memory circuit 4 has received an FAV and an FAR spike pulse corresponding to the leading and trailing edges, respectively, of an initial video pulse in a processing cycle over lines 414 and 415, the counters 54 and 55 will operate to produce at their outputs similar pulses spaced by multiples of 1.45 $\mu$s. from the original FAV and FAR pulses, thereby representing "memories" of the phase condition of each of these pulses. These "memory trains" of spike pulses continue so long as a "Forget Initial Pulse" command signal has not been applied to the resetting inputs 56 of binaries 50, 51.

The counters schematically shown throughout the drawing, including the counters 54 and 55 just referred to, are assumed to include the conventional output decoder matrices usually associated with such binary counters. The outputs such as $a1$–$a16$ (counter 54) represent the outputs of such a matrix, and hence each such output delivers spike pulses occurring one clock period (0.09 $\mu$s.) before and after the spike pulses from the adjacent counter outputs. Any single one of the counter outputs, of course, delivers spike pulses recurring at intervals of one counter cycle, which in the case of counters 54 and 55 is $0.09 \times 16 = 1.45$ $\mu$s. as stated above.

The memorized leading-edge pulses are herein termed FAVM and the memorized trailing-edge pulses are termed FARM. While these memory pulses may in principle be derived from the end outputs $a16$ of the counters 54, 55, in order to be strictly in phase with the original FAV and FAR pulses respectively, it is preferred, in view of the timing tolerances permitted, to generate the FAVM pulses in slightly advanced relationship with respect to the original FAV pulses, and to let the FARM pulses somewhat lag behind the original FAR pulses.

To obtain the phase-leading FAVM pulses, the output from counter 54 is derived from counter output $a15$ instead of $a16$, so that the FAVM pulses lead by 0.09 $\mu$s. (one clock period) the original FAV pulse. And to obtain the delayed FARM pulses, there is used a delay circuit constructed as follows.

The delay circuit includes an auxiliary counter 57, herein a two-stage binary counter of capacity $2^2=4$, which is caused to initiate a count on being triggered by the output of an AND-gate 59. The end output $a16$ from counter 55 acts to set a binary 58 whereupon the binary output enables gate 59 to pass clock spike pulses from generator 47 to the input of auxiliary counter 57. The end (fourth) output from counter 57 resets binary 58 and simultaneously clears counter 57 as shown by the RAZ connection. The FARM spike pulses may be derived e.g. from the second output of auxiliary counter 57, whereby they will be delayed by two clock periods (0.18 $\mu$s.) with respect to the original FAR spike. It will be apparent that with the arrangements here described, both the amount of phase lead used for the FAVM spikes and the amount of phase lag used for the FARM spikes can readily be altered to suit the tolerances specified for the system.

As will be clarified later, among the functions of the FARM spike pulses is the recognition of a phase-garbling situation wherein the code pulses, subsequent to a certain position within the code group, appear as pulses of increased width, in that their trailing edge is displaced beyond its true position. To provide for this function, so-called "Displaced Trailing-edge" spike pulses, termed FARD (for the French "Front Arrière Déplacé), are derived from the FARM pulses, in the following manner. Each FARM spike pulse from auxiliary counter 57 sets a binary 510 which is later reset by a FAVM pulse. Binary 510, when set, energizes one input of an AND-gate 511 having another input connected to FAR line 415. Thus, should an actual input pulse be received after the time of occurrence of the FARM spike pulse, the trailing edge FAR of said actual input pulse is passed by gate 511 as a FARD spike over line 512. Since the FARM spikes lag the FAR spikes by (herein) two clock intervals as described above, the presence of the FAR spike after binary 510 has been set by a FARM spike indicates that said actual input pulse is of abnormal width. The occurrence of a FARD spike pulse on line 512 is an indication of such condition. It will be noted that AND-gate 511 includes a third input designated 519. This line 519 leads from the reset output of the binary 80 in the First Investigator circuit 8 as later described. Hence the FARD spike pulses are only derived during the so-called first investigation period for reasons that will later become clear.

A chief function of the FAVM and FARM spikes is to control the opening and closure of the video gates 11 and 11' by way of the gate-control circuit 13. As will be explained in detail later, whenever circuit 13 has assigned priority to channel 1, video gate 11 must be opened and video gate 11' closed on occurrence of a FAVM spike pulse. Accordingly the FAVM pulses from counter 54 are applied directly over a line 518 to said circuit 13. When, moreover, priority has been assigned by circuit 13 to channel 1, video gate 11 must be closed and video gate 11' opened on occurrence of a FAR spike pulse if an actual code pulse is present at the input, otherwise on occurrence of a FARM memory spike (if the incoming pulse position in the code is vacant). Selection between the FAR and FARM spike pulses is effected as follows. The FAVM spike pulses are applied to the setting input of a binary 513. The resetting input of this binary is connected to line 414. Thus, should the leading-edge spike FAV of an actual code pulse occur one clock period after the said FAVM pulse (it will be recalled that the FAVM spikes are advanced by one clock period), binary 513 is reset by the FAV spike. While in its set state binary 513 enables an AND-gate 514 to pass FARM spike pulses to an OR-gate 516. While in its reset state said binary enables an AND-gate 515 to pass FAR pulses from line 415 to another input of OR-gate 516. It is noted that since a FARM spike occurs at least 0.35 μs. later than a FAVM pulse (0.35 μs. being the minimum width of a code pulse), the resetting of binary 513 by a FAV spike necessarily causes AND-gate 514 to be closed on occurrence of a FARM spike pulse. Hence, OR-gate 516 will pass a FARM spike pulse or a FAR spike pulse to its output line 517 according to whether binary 513 is not, or is, be set by an incoming code pulse.

Pulse-testing circuit 5 (FIG. 6).—The function of this circuit is to 'sample" each of the incoming video pulses, i.e. to test whether or not its position corresponds to that prescribed for a pulse position in an incoming code, and to accept or reject the pulses according to the result of the test. The testing circuit comprises the pair of AND-circuits 60 and 61 having their first inputs connected to the outputs 412 and 413 respectively of binary 410 (FIG. 4) and their other inputs connected to a suitable output of counter 54. Conveniently, the counter output used is the output $a2$, which lags by two clock cycles behind the leading edge of the incoming pulse, thereby allowing for the permitted tolerance in respect to pulse position. In case of a correctly positioned code pulse the testing circuit delivers a "1" output on line 62 and a "0" output on line 63, otherwise the reverse. The manner in which these test signals are used in the system will be later disclosed in detail, but it may already be stated at this point that the information pulses on lines 62 and 63 are applied to the input stage of the digital shift register 6 in the LA unit, to enter the code pulse into said register.

Input-gate-control circuit 13 (FIG. 7).—The function of this circuit is to control the video input gates 11 and 11' by way of their control binaries 12, 12', in order to direct the incoming video pulses of one code group into one channel, and direct the incoming pulses of another code group not in phase with the first code group (i.e. constituting a different transponder response) into the other channel.

Normally circuit 13 causes the gates 11, 11' to function in a so-called "priority" mode of operation. In this mode, both gates open and close in complementary fashion, the closure of each gate being synchronous with the opening of the other gate. One of the gates and the associated channel are said to have priority over the other gate and channel. This means that the priority gate is operated so as to accept a further video pulse if in phase with the last pulse passed into the associated channel, whereas the non-priority gate is operated to reject such pulse. Either gate can retain priority for a single pulse position or over any number of pulse positions. Priority is switched from the priority gate to the other gate by the action of circuit 13, whenever the testing circuit 5 associated with that other gate has passed a video pulse, which pulse is necessarily out of phase with the pulse or pulses previously passed through the priority gate since it has occurred during an open period of the non-priority gate.

To achieve this type of operation, circuit 13 controls the opening and closure of the input gates in response to the FAVM, FARM and FAR spike pulses. Specifically, every memorized leading-edge spike FAVM causes the priority gate to open and the non-priority gate simultaneously to close. Thus a code pulse, if present at the pulse position determined by the FAVM spike, is passed by the priority gate and rejected by the non-priority gate. The priority gate is then closed, and the non-priority gate simultaneously opened, in response to the trailing-edge spike FAR of such code pulse, if present, or by the memorized trailing-edge spike FARM if the pulse position is vacant. Initially, one of the gates, specifically gate 11, is opened and the other gate closed by a radar synchronizing pulse from the radar system. Thus an initial video pulse from an initial response code group is necessarily passed by gate 11, and initial priority is assigned to this gate. Any subsequent video pulses in phase with such first pulse, and hence presumably forming part of the same response code group, are consequently also passed by gate 11 into channel 1. However, a video pulse out of phase with said initial pulse will be passed through the other gate 11' and priority is then switched to this other gate so that any subsequent pulses in phase with the first out-of-phase pulse, and hence presumably forming part of the same response code group as the latter (received from a different transponder than the first response code group), are also passed by gate 11' into channel 1'.

This manner of operation will now be clarified with reference to FIGS. 2a–2d.

In each of these figures, the uppermost castellated line indicates a train of incoming video pulses. The second castellated line shows the open and closed conditions of gate 11 and the lowermost line shows the open and closed conditions of gate 11'. In each of these last two curves, the level designated O refers to the open condition of the gate and the level F to the closed condition. The chain lines indicate which of the two gates has priority at any particular time. Arrow $t$ indicates the flow of time.

Figure 2A:
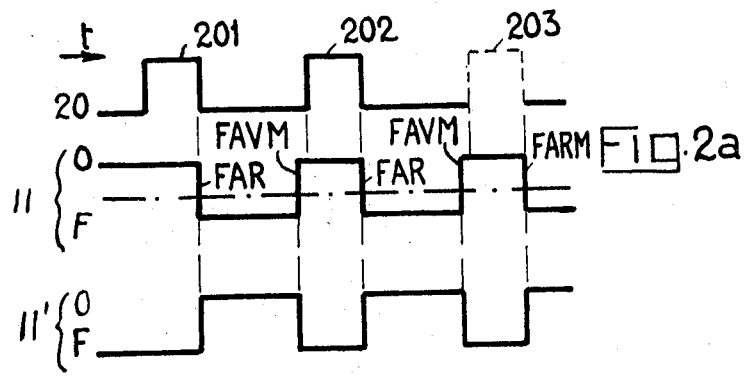

In FIG. 2a, it is assumed that the system receives a train of pulses forming part of a single code group and hence all in phase. Gate 11 is initially open, gate 11' closed. An initial code pulse 201 is passed by open gate 11 into channel 1, whereupon initial priority is assigned to gate 11. The trailing edge of pulse 201, through the agency of trailing edge spike FAR acting through circuit 13, closes gate 11 and simultaneously opens gate 11'. The subsequently occurring memorized leading edge spike FAVM causes circuit 13 to re-open gate 11 and close gate 11'. Hence the second pulse 202 is accepted by gate 11 and rejected by gate 11'. The trailing-edge spike FAR from the second pulse 202 causes circuit 13 to close gate 11 and open gate 11'. The third pulse position 203 of the incoming code group is here assumed to be vacant. As in the previous pulse positions, the memorized leading edge FAVM causes circuit 13 to open gate 11 and close gate 11'. Since however this pulse position is assumed to be blank, there is no pulse trailing edge to actuate the gates. However, the memorized trailing edge FARM, provided by pulsewidth memory circuit 4, serves to operate circuit 13 to close gate 11 and open gate 11' as required. Thus the entire train of in-phase pulses is passed through gate 11 into channel 1. In this case gate 11 has retained its priority throughout, as indicated by the dot-dash line.

Figure 2B:
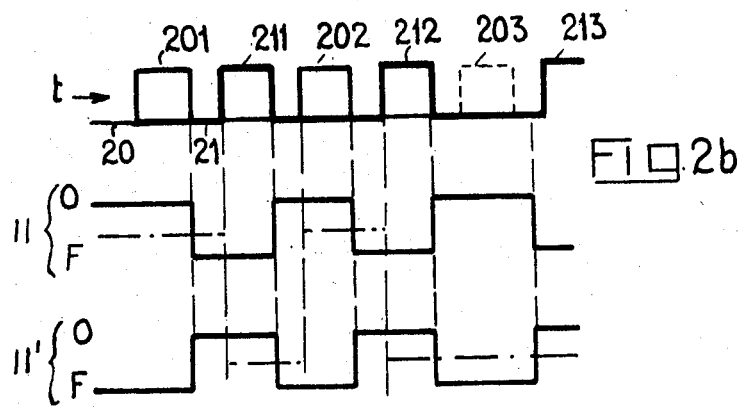

In FIG. 2b, it is assumed that there are two interleaved incoming pulse trains 20 and 21 (interleaved garbling). The initial pulse 201 (code group 20) is passed by open gate 11, and its trailing edge closes gate 11 and opens gate 11'. The next input pulse 211 forms part of code group 21 and hence is out of phase with pulse 201. This is sensed by circuit 13 which thereupon switches priority to gate 11'. In this condition, the trailing edge FAR of pulse 211 opens gate 11 and closes gate 11' instead of the reverse (as would be the case if gate 11 still retained priority). The next input pulse 202 again is out of phase with the preceding pulse, so that circuit 13 switches priority back to gate 11. Since gate 11 is still gate 11' closed, pulse 202 is passed by gate 11' and since gate 11 has taken over priority, the trailing pulse edge FAR closes this gate and opens gate 11'. For the next pulse 212 the operation is similar, the pulse being passed through gate 11' and priority being returned to gate 11. There now comes a blank pulse position 203. Gate 11' retains priority since there is no out-of-phase pulse to cause the circuit 13 to change priority between the gates. The following pulse 213 is in phase with the preceding pulse 212. Hence gate 11' still retains priority, and this pulse is therefore passed by gate 11'. It will be seen that in this configuration of pulses, pulses of the respective code groups 20 and 21 are passed respectively to channel 1 and channel 1'. A separation between the interleaved code groups is thus accomplished.

Figure 2C:
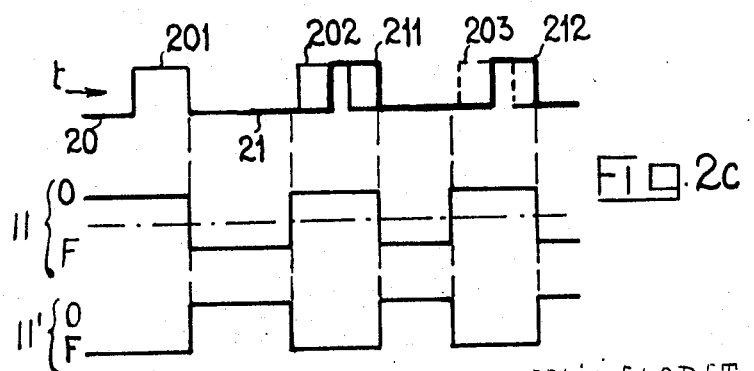

In FIG. 2c, the two code groups 20 and 21 are assumed to be in a phase-garbled configuration, with the first code group (20) in leading relation. The initial pulse 201 is passed by open gate 11 and its trailing edge (FAR) closes gate 11 and opens gate 11'. The next pulse 202 has its leading edge in phase with that of the first pulse, hence priority remains with gate 11, and the memorized leading edge (FAVM) opens gate 11 and closes 11'. In the present configuration, the first pulse 211 of code group 21 is fused with pulse 202 of code 20, and the system acts as though it were presented with a single pulse of increased width. Since priority is still with gate 11, the trailing edge (FAR) of pulse 211 closes gate 11 and opens gate 11'. The next pulse position 203 of code group 20 is again assumed to be vacant. Since there is no out-of-phase pulse ahead of this pulse position, gate 11 still maintains priority, and the memorized leading edge (FAVM) of pulse 201 opens gate 11 and closes gate 11' in time to pass pulse 212 of code 21 through gate 11. The trailing edge (FAR) of this pulse closes gate 11 and opens gate 11', and the operation continues, with priority remaining continuously with gate 11 as shown by the continuous chain line. It will be seen that in this phase-garbled configuration, the leading pulse group 20 can be effectively extracted by the extractor system of the invention just as if it were not garbled. The later code group 21 is extracted, however; the fact that phase grabling is present is detected by the system because of the presence of a displaced trailing-edge spike pulse (FARD), as described with reference to FIG. 5, and the manner in which this information is utilized in the logical analyzer unit to produce a GPH output signal will be described later.

In FIG. 2d, the code groups 20 and 21 are again assumed to be in a phase-garbled configuration, but this time the later code group 21 is in phase-leading relation. The initial pulse 201 of code group 20 is passed by open gate 11, and its trailing edge closes this gate and opens gate 11'. The next incoming pulse is pulse 211 (code group 21) and its leading edge is out of phase with the memorized leading edge FAVM of pulse 201. Hence priority is switched to gate 11', as shown by the dot-dashed lines. As in the case of FIG. 2c, the combined pulses 211–202 are treated as a single pulse which is passed by gate 11'. The trailing edge of pulse 202 acts to close gate 11' and open gate 11 (since gate 11' has priority). Thereafter the system does not receive any pulses whose leading edges are out-of-phase with the leading edge of the initial group-21 pulse 211, and priority therefore rests with gate 11' throughout. In this case the first-received code group 20 is only partially passed to channel 1, as far as the first pulse 211 of the garbling code group 21. This second code group 21, however, is passed in full into channel 1' and is effectively extracted by the system and passed to the decoder as though it were ungarbled. The fact that phase garbling is present is detected by the system because of the presence of a curtailed pulse group (20) in channel 1, and the logical analyzer unit will utilize this information to deliver a GPH signal to the decoder as later described.

It will be noted (see e.g. pulses 202 and 203, FIG. 2a) that the opening of the priority gate under control of a FAVM spike pulse occurs a short time ahead of the prescribed timing for the leading edge of an in-phase pulse. This is due to the 0.09 μs. lead imparted to the FAVM spike pulses in memory circuit 4, as earlier described, and takes care of system tolerances.

In addition to the priority mode of operation so far described, the control circuit 13 is also capable of operating the video gates 11, 11' in a so-called expectant mode, or X-mode, in which both video gates 11 and 11' are held forcibly open.

The X-mode of operation of the video gates provides for the separate extraction, in channels 1 and 1' respectively, of two out-of-phase code groups which are separate in time, i.e. such that the trailing edge of the F2 pulse of the first group is spaced at least 0.25 μs. from the leading edge of the F1 pulse of the second group, while not being completely isolated, i.e. being such that the leading edge of the F1 pulse of the first group is spaced less than two code-group lengths, or 40.6 μs., from the leading edge of the F1 pulse of the second code group.

In this "separate," as distinguished from the "isolated," relationship of the two code groups, the first group has not been completely processed in the shift register nor has it passed therefrom to the decoder at the time the second code group is received, since the combined operating period of the shift and buffer registers amounts to three code-group periods and the processing therein takes 60.9 μs. As will be disclosed later, as soon as the leading code pulse of a code group enters the shift-register line of a particular channel, shift pulses are applied to the register line which are all in phase with the leading edge of that pulse until the code group has passed out of the register line at a time three code-group periods (60.9 μs.) after the entry of said leading pulse into the line. Hence, any subsequent code pulses received by the system less than 60.9 μs. after reception of said leading pulse of the first code group, and out of phase therewith, cannot be processed in the same register line but must be passed into the register line of the other channel.

This requirement is taken care of by the X-mode of operation. This mode is instituted by circuit 13, as will become clearer further on, whenever the logical analyzer unit senses the presence of a code group in the first section A of the shift-register line of one channel at a time when the shift-register line of the other channel is vacant, and said other channel accordingly disabled. In such a so-called X-situation, circuit 13 holds both video input gates 11, 11' forcibly open. Any subsequently entering video pulse is then passed by both gates, but the pulse is simultaneously tested in circuit 13 to determine the phasing of its leading edge. If this is found to agree with that of the earlier pulses present in the channel-1 register, priority is accorded gate 11 and the pulse is passed into channel 1. Otherwise priority is accorded gate 11' and the pulse is passed into channel 1'. In either case the X-situation is terminated and the priority mode of operation resumes.

As shown in FIG. 7, the Input-Gate Control circuit 13 includes a priority-control binary 70 which when set to its so-called 1-priority state, grants priority to video input gate 11 and when set to its complementary 1'-priority state grants priority to gate 11'.

The setting and resetting inputs for binary 70 will be later described. First, the manner in which binary 70 operates in each of its two states to control the input-gate binaries 12 and 12' will be disclosed.

Assume priority binary 70 has been set to its 1-priority state in which it assigns priority to channel 1. Its upper output is then energized and its lower output deenergized. Energization of the upper output applies voltage to one input of each of two AND-gates 71, 72. AND-gate 72 is then enabled to pass FAVM spike pulses from line 518 through an OR-gate 73' to the setting input 40 of binary 12, by way of an OR-gate 74 whose function will appear later, and to the resetting input 41' of binary 12'. Simultaneously, gate 71 is enabled to pass FARM or FAR spike pulses (according to whether an actual code pulse is not or is present at the time) from line 517 through an OR-gate 73 to the resetting input 41 of binary 12 and (by way of an OR-gate 74') to the setting input 40' of binary 12'. In this condition of binary 70, therefore, video gate 11 will be opened and video gate 11' closed at each occurrence of a memorized leading-edge spike FAVM in channel 1, and video gate 11 will be closed and video gate 11' opened at each occurrence of an actual or memorized trailing-edge spike FAR or FARM in channel. When binary 70 is in its 1'-priority state, the operation is reversed as will be evident from the symmetry of the circuit connections. That is, video gate 11 will be opened and gate 11' closed at each occurrence of an actual or memorized trailing-edge spike FAR or FARM in channel 1', and video gate 11 will be closed and gate 11' opened at each occurrence of a memorized leading edge spike FAVM in channel 1'.

For holding both input gates 11, 11' open in an X-situation, there are provided the previously mentioned OR-gates 74 and 74' interposed in the setting inputs of binaries 12 and 12'. Each OR-gate has one of its inputs connected to a line delivering a so-called $(X+X')$ signal, which indicates that an X-situation is present in respect to either channel 1 or channel 1'. The manner in which this signal is produced will be described later.

The OR-gates 74, 74' each have an additional input from an AND-gate 75, 75'. Each AND-gate has one input receiving a "Forget initial pulse" signal from the First Investigator circuit, later described, relating to the complementary channel by way of line 56' or line 56 respectively, and another input from the reset output 76 or 76' of the memory circuit binary 50 or 50', indicating that the related channel is free of pulses and has accordingly been disabled. Hence the issuing of a "Forget" command in channel 1', after channel 1 has been evacuated, effects the opening of gate 11, and vice versa.

It will also be noted that the OR-circuit 74 has an additional input 42 applied to it. This input is connected to receive a conventional synchronizing pulse from the secondary radar transmitter, which is generated at the start of any interrogation procedure. As shown, the synchronizing-pulse line 42 is also applied to an input of an OR-circuit 741 connected in the resetting input 41' of the gate-control binary 12' in channel 1'. In this manner, at the commencement of an interrogation procedure video gate 11 is opened and gate 11' closed. Channel 1, therefore, is always first to commence operations in the embodiment disclosed. If desired, however, the construction can easily be modified to cause the two channels to alternate in initiating operations at each interrogation process. For this purpose, an additional binary (not shown) may be provided, which will be alternately set and reset by consecutive ones of said synchronizing pulses, the outputs of said binary being applied to the gate-control binaries 12 and 12' so as to cause one gate (say 11) to be opened and the other (11') closed at the initiation of an odd-numbered interrogation, and the reverse at the initiation of an even-numbered interrogation.

For the normal priority mode of operation, the switching of binary 70 between its two states granting priority to the respective channels is effected by way of OR-gates 77 and 77' connected to the respective setting and resetting inputs of the binary. Or-gate 77 has a first input connected to the output of an AND-gate 78 having an input connected to the testing-circuit output line 62 and its other input connected to receive an $\overline{X}+\overline{X}'$ signal produced as later described, this signal being the negate of the above-mentioned $(X+X')$ signal and indicating that neither of the X and X' situations is present. Thus, AND-gate 78 is enabled to set priority binary 70 to the state wherein it accords priority to channel 1, in the absence of an X or an X' situation, every time an input video pulse is passed by the tester circuit 5 of the channel. This represents the normal or principal mode of operation described, wherein priority is retained by a channel whenever the system receives an input pulse in phase with a preceding pulse passed by that channel and until such time as the system receives an input pulse in phase with a preceding pulse passed by the other channel.

As indicated above, during an X (or X') situation priority must be granted channel 1 on reception of an input pulse if it is in phase with the code group already present in the register of channel 1. For this purpose OR-gate 77 has an input XI connected to the output of an AND-gate 79 having a first input receiving the X signal, another input connected to receive regenerated incoming pulses from line 412 of circuit 3, and a third input connected to the output of an OR-gate 710. This OR-gate has three inputs from the $a1$, $a2$ and $a3$ outputs of pulsewidth-memory counter 54. It will be recalled that the $a2$ output is used as the phase reference in the testing circuit 5 for passing or rejecting incoming pulses according as they are in phase or out of phase with the pulses already present in the channel register, and that outputs $a1$ and $a3$ respectively lead and lag over the $a2$ output by amounts of one clock period, 0.09 $\mu$s. Thus, the AND-gate 79 will be enabled for setting binary 70 to its 1-priority state by way of OR-gate 77, during an X situation, on reception of an input pulse which is in phase with a pulse of the previous code group present in the register of channel 1, to within the permitted phase tolerances of the system.

On the other hand, during such an X situation priority must be granted channel 1' on reception of an input pulse not in phase with the code present in the channel-1 register. This is obviously the same (since operation is symmetrical as between the channels) as saying that during an X' situation priority must be granted channel 1 on reception of an input pulse not in phase with a code present in the channel-1' register. OR-gate 77 accordingly has a third input connected to the output of an AND-gate 711 having a first input receiving the X' signal, another input connected to receive the regenerated input pulses from line 412, and a third input connected to the output of a "not-or" gate 712. This gate has three inputs connected to the $a1'$, $a2'$ and $a3'$ outputs of pulsewidth-memory counter 54' associated with channel 1'. Thus the AND-gate 711 will be enabled for setting binary 70 to its 1-priority state by way of OR-gate 77, on reception of an input pulse not in phase with the code group present in the register of the other channel (1'), to within the phase-tolerance range permitted the system. A last input of OR-gate 77 is from the "Forget"-command line 56' relating to channel 1'. Thus the Forget command, at the same time as it opens the other channel input gate through OR-gate 75' or 75, also grants priority to that other channel by way of OR-gate 77' or 77.

The logical analyzer unit LA

Shift registers and investigation control circuits (FIG. 8).—As earlier indicated, the shift register 6 is in two serially connected sections, section A having fifteen binary stages and section B fourteen. With the initial stage of section A is connected the "1" output line 62 from the Tester circuit 5 (see FIG. 6), whereby each successive input pulse applied to the system, provided it has been passed by the Tester circuit, is entered into the shift register. The entered pulses are then shifted along the stages of the shift register 6, at the rate of one shift every 1.45 $\mu$s., by the application of shift pulses to all of the register stages in parallel. The shift pulses used are the sampling pulses derived from the $a2$ output of counter 54 (see FIG. 6) and applied over line 540 in parallel to all of the stages of register 6. Hence the shifting of the entered pulses through the shift register occurs in precise phase synchronism with the initial code pulse applied to the channel. Each stage of register 6, in this embodiment, is a binary element having a 1 and a 0 state, as shown by the blank and hatched portions for some of the stages. Thus a register stage is able to represent either a pulse or its negate (a "non-pulse"). A pulse, say, in the first stage of register A is represented herein as 1A, and a non-pulse as $\overline{1A}$.

The buffer register 7 is a fourteen-stage register having its stages connected with respective stages of the B-section of shift register 6 for parallel transfer of the contents of said B section into the buffer register through conventional means not shown.

As earlier indicated, the entire contents of both stages of shift register 6 are investigated in three consecutive steps. If one designates as shift time 0 the time of entry of the initial framing pulse F1 of a code group in the first stage 1A of register section A, then the first investigation is performed from shift time 0 through time 14, the second investigation from time 15 through time 28, and the third investigation from time 29 through time 42. For controlling the performance of the three steps of investigation there are provided the binaries 80, 81, 82, each of which remains in its set stage throughout the respectively associated shift-time period just specified. The general manner of operation of the set and reset control circuitry for these binaries is as follows. First-step binary 80 receives its setting command (through a so-called synchronizing AND-gate 83 later described) from the first-state output 1A of register section A, and receives its resetting command (through a synchronizing AND-gate 85 and a further AND-gate 86 later described) from the output of an AND-gate 84 which has its inputs connected to the 1A and 15A stage outputs of the shift register so as to sense the simultaneous presence of pulses in both said stages, i.e. the coincidence $1A \cdot 15A$. Similarly, second-step binary 81 is set (by way of the AND-gates 85 and 86) by an output pulse from AND-gate 84, i.e. on occurrence of the $1A \cdot 15A$ coincidence, and is reset (by way of a sampler gate 89 and a further AND-gate 810 later described) from the output of an AND-gate 88 which senses the coincidence $15A \cdot 14B$. Third-stage binary 82 is similarly set (from the output of gate 810) on occurrence of the said $15A \cdot 14B$ coincidence, and is reset fourteen shift times later (i.e. at time 42), by way of a synchronizing AND-gate 815, from the output of a fourteen-stage shift-pulse counter 814 which starts counting at the time binary 82 is set.

The aforementioned synchronizer AND-gates 83, 85, 89, each of which receives the output of a register stage at one of its inputs, receives at its other input a narrow sampling spike pulse $a$, which may be identical with the $a2$ pulses supplied by line 540 and serving as the register shift pulses. Thus the relatively broad register output pulses are converted into narrow and precisely timed spike pulses for accurate control of the investigation control binaries.

Means are included for preventing the investigation control binaries from being operated to their set and reset states as a result of spurious coincidence liable to occur in the shift register. Thus, the aforementioned $1A \cdot 15A$ coincidence used to reset the first-step binary 80 and reset the second-step binary 81, instead of indicating the simultaneous presence of the initial and final framing pulses F1 and F2 relating to a common code group in the first and last stages of register section A, might actually be caused by code pulses forming part of different code groups one of which has entered and the other at which is about to leave the A section. To prevent such spurious coincidences from actuating the binaries 80 and 81, the aforementioned AND-gate 86 has its second input connected by way of a delay device 87 to the reset output of binary 81. Thus binary 80 can be reset, and binary 81 set, only if binary 81 is in its reset state. The reset state of binary 81 indicates that a complete code group has been entered into register section B, and the occurrence of a $1A \cdot 15A$ coincidence must then necessarily represent a coincidence between the framing pulses F1 and F2 of a common code group.

In a similar manner, AND-gate 810 has its second input connected through a delay device 811 with the reset output of binary 82, thereby preventing binaries 81 and 82 from being respectively reset and set unless binary 82 is in its reset state, indicating that the $15A \cdot 14B$ coincidence sensed by AND-gate 88 refers to a coincidence between pulses of a common code group.

The counter 814 serving to reset binary 82 is operated as follows. The output spike pulse from AND-gate 89 indicative of an $15A \cdot 14B$ coincidence acts to set a binary 812, which thereupon enables an AND-gate 813 to pass shift pulses $a$ into the counter 814, herein a four-stage binary counter, adapted to count sixteen pulse periods. The 14th count 614, as derived from the appropriate output of the conventional counter decoding matrix, is applied by way of a synchronizing AND-gate 815 to the reset control of binary 82, resetting the binary.

Means are provided for resetting the counter-control binary 812 one clock period (0.09 $\mu$s.) after the resetting of binary 82, in order to allow the counter 814 to accept a further code following the preceding code group by as little as one pulse period (1.45 $\mu$s.). For this purpose the resetting spike pulse from AND-gate 815 serves to set a binary 816, which is reset one pulse period later by the next shift pulse $a$. The output pulse from binary 816, one pulse period wide, is passed through a synchronizing AND-gate 817 which receives at its other input a spike pulse timed 0.09 $\mu$s. later. The desired 0.09 $\mu$s. delay is thus obtained for the resetting of binary 812.

Counter 814 has a "Clear" control input (RAZ) from the output of synchronizing gate 89 so as to be cleared of its contents just prior to the start of each count.

It will be observed that the second and third investigation binaries 81 and 82 are only set during their respective periods in the event that a $1A \cdot 15A$ coincidence, indicative of the presence of a true code group in register 6, has occurred. On the other hand the first investigation binary 80 is set every time a pulse enters the register and hence is set in the event of a "false alarm."

First investigation (false-alarm discrimination) circuit 8 (FIG. 9).—The function of the first investigation circuit is to discriminate between true code pulses and false-alarm pulses in the register section, and memorize false-alarm situations for the benefit of the Second Investigation.

A false-alarm situation arises when a spurious video pulse has contrived to pass through the tester circuit 5 and has been applied to the A section of register 6. Such a false-alarm pulse, on progressing down register section A into stage 15A thereof, will most probably not coincide at that time with a pulse present in stage 1A. In other words, a $1A \cdot 15A$ coincidence indicative of a true code group will not then occur. In that case, means are provided for prolonging the first investigation should another code pulse be present anywherein the A register section at the time, until such pulse has reached stage 15A. The test for a $1A \cdot 15A$ coincidence is then repeated, and this process is continued until a $1A \cdot 15A$ coincidence has been sensed or until all isolated false-alarm pulses have passed out of section A of the register.

The first-investigation circuit also includes means for sensing whether a code is present in register section B, at the time a pulse in stage 15A is tested for possible coincidence with a pulse in stage 1A. The circuit also includes means for issuing a "Disable" or "Forget" command on line 56 in any one of the following cases: an isolated false-alarm pulse, or the last of a series of false-alarm pulses, is about to quit register section A, provided there is no preceding code being processed in section B; and a preceding code processed in section B is about to quit said section, after all false-alarm pulses have quit section A.

The "Forget" command on line 56 resets the binaries 50 and 51 (FIG. 5) and arrests the memorizing counters 54, 55 of the channel involved (here channel 1), thereby holding the occupation time of each channel to the minimum consistent with no loss of information therein, and clearing the channel for the handling of any subsequent pulse code group regardless of its phasing.

In describing the operation of registers 6 and the associated investigation circuits the following conventions are used as regards the timing. An initial code pulse entered in stage 1A of register section A is taken as defining pulse (or shift) time 0. Thus, when this initial pulse has advanced to stage 15A it is pulse time 14. If at this time the initial pulse is found to be coincident with a pulse at 1A, i.e. if a 1A·15A coincidence is sensed and said initial pulse therefore proves to be the initial framing pulse F1 of a code group, then the Second Investigation commences at the immediately following pulse time, i.e. time 15. If, however, on arrival of the initial pulse at stage 15A at pulse time 14 no 1A·15A coincidence is detected, or in other words a $\overline{1A}$·15A coincidence is detected, whereby said initial pulse proves to be a false-alarm, then the next-following pulse period is not designated as 15, but the time count is deemed to be suspended until a true initial code framing pulse F1, if any, is sensed at stage 15A as a 1A·15A coincidence. Otherwise stated, pulse (or shift) time 15 in all cases designates the time of entry of a true initial code framing pulse F1 into register section B, and the time of initiation of the Second Investigation. The time count thereafter progresses in a regular way so that at pulse time 28 the code is entirely registered in register section B, with its F1 framing pulse in stage 14B and its F2 framing pulse in section 15A. The second investigation is terminated at this time. At pulse time 29 the code is transferred in parallel from register section B into buffer register 7, and has simultaneously advanced one stage in register section B. This is the time of initiation of the third investigation. At time 42 the end framing pulse F2 of the code group is in stage B14 and the third investigation (as well as the entire processing of the code) is terminated.

Before describing the First Investigator circuit 8 in detail, its various logical functions will be summarized in Table I. As will be apparent from the foregoing disclosure, the circuit produces two output signals: (1) a decision signal to "prolong first investigation," called signal P; and (2) a "Forget" command signal, on line 56, called signal F. Table I refers primarily to the decision as to issuance of the F signal, as taken at pulse time 14. The decision is reached in response to three conditional factors: presence or absence of pulses in section B at time 14, as indicated by the state of binary 82; occurrence or non-occurrence of a $\overline{1A}$·15A "coincidence"; and whether or not a P (prolong-first-investigation decision) signal has been issued. Digits 0 and 1 means that the specified condition is not, or is, satisfied. Certain combinations between the stated conditions, though logically impossible, have been included for completeness.

TABLE I

| Binary 82 set | $\overline{1A}$·15A | P | Significance | Decision |
|---|---|---|---|---|
| 0 | 0 | 0 | A true code is present in Reg. A. Investigation (Step 2) should proceed. | No F Command. |
| 0 | 0 | 1 | Cannot occur. | |
| 0 | 1 | 0 | An isolated false-alarm pulse. Channel should be disabled at once. | Issue F command at time 14. |
| 0 | 1 | 1 | A series of false-alarm pulses; channel should be disabled with last one. | Issue F command as last F-A pulse reaches 15A. |
| 1 | 0 | 0 | One code in Reg. A, another in Reg. B; investigation (Step 2) should proceed. | No F command. |
| 1 | 0 | 1 | Cannot occur. | |
| 1 | 1 | 0 | An isolated F-A pulse following a code; channel should be disabled as soon as this can be done without information loss. | Issue F command when preceding code quits Reg. B. |
| 1 | 1 | 1 | A series of F-A pulses following a code; channel to be disabled as soon as can be done without losing informations. | Issue F command on entry of last F-A pulse in 15A after preceding code has quit Reg. B. |

The First Investigation circuit 8 will now be described in detail.

FIG. 9 shows the first-investigation control binary 80 with its setting and resetting inputs. In this figure, as in subsequent figures relating to the logical circuitry, certain input lines derived from a stage of the register will be designated by the logical signals carried thereby. Thus, the setting input of binary 80 is designated 1A and its resetting input is designated 1A·15A for reasons that will be evident from earlier explanations.

The first-investigation circuit includes a binary 90 whose setting input is connected to the output of an AND-gate 91 having line 1A as one of its inputs and having its other input connected to the set output of binary 80. Hence, binary 90 will be set at each appearance of a second pulse in register stage 1A following an initial pulse that has set the binary 80. Binary 90 is reset simultaneously with binary 80 by a pulse on the 1A·15A coincidence line. Binary 90 when in its set state enables an AND-gate 92 to pass pulses from a $\overline{1A}$·15A line, to the output of said AND-gate. The $\overline{1A}$·15A line as its designation implies, carries a signal indicative of a coincidence between a pulse in register stage 15A with a "non-pulse" in stage 1A, and is derived from a logical network (not shown) exactly identical with the logical network consisting of the AND-gates 83, 84, 85 and 86 of FIG. 8, except that the inputs to the AND-gates 83 and 84 instead of being tapped off the "1" output of the 1A stage or register 6 would be tapped off the "0" output (shown crosshatched) of said stage, i.e. the $\overline{1A}$ stage as shown.

It will be understood that if the first pulse, i.e. the pulse that has set binary 80, is proved to be a true initial framing pulse F1 of a code group as it reaches stage 15A, the 1A·15A line is energized and binary 90 is reset, so that the second pulse, as it in turn reaches stage 15A, will not be passed by AND-gate 92 even though said second pulse may be a false-alarm pulse. If however the first pulse is revealed to be a false-alarm pulse on reaching stage 15A, binary 90 is not reset and the second pulse on reaching stage 15A, if it too is a false-alarm pulse, will be passed to the output of AND-gate 92.

It will thus be apparent that the occurrence of an output from AND-gate 92 indicates the arrival at register stage 15A of a second false-alarm pulse following closely (i.e. by less than a code-group time, 20.3 μs.) upon a first false-alarm pulse. This occurrence causes the circuit to decide that the first investigation is to be prolonged. Accordingly the output from AND-gate 92 is applied to the setting input of a prolongation binary 93 which thereupon emits over its set output a P signal indicative of a Prolongation decision at pulse period 14 in channel 1.

The prolonged first investigation is terminated on resetting of the extension binary 93, through energization of its resetting input by way of a two-input OR-gate 96. Thus the extended investigation may be terminated in either of two ways.

One event that will terminate the extended investigation is the sensing of a true code group in register section A, as indicated by the sensing of a 1A·15A coincidence during the set state of binary 80. For this purpose there is provided an AND-gate 94 having an input from the 1A·15A line and another input connected, through a delay device 95, with the set output of binary 80. The output of AND-gate 94 constitutes a first input to OR-gate 96.

The other event capable of terminating the extended investigation is that all of the unpaired false-alarm pulses that have entered register section A pass out of that section without a single paired pulse (indicative of a true code group in the register section) having occurred in their midst. To sense this latter event there is provided an add-subtract (up-and-down) counter 97. Counter 97 has its plus or up-count input 971 connected to the output of AND-gate 91 so as to cause the counter to start an up-count whenever a pulse appears in register stage 1A following the setting of binary 80. The minus or down-count input 972 of counter 97 is connected to the output of AND-gate 92 so as to cause the counter to start a down-count whenever an unpaired pulse appears in register stage 15A and is about to leave register section A. Counter output 970 delivers an output when the resulting count is zero, indicating that all the unpaired pulses that have entered register section A have passed out of the section. Counter output 970 constitutes the second input to OR-gate 96.

Counter 970 has a clearing input RAZ energized from the $1A \cdot 15A$ line, i.e. on detection of a pulse pair indicative of a true code group in the register section A, simultaneously with the resetting of binary 80.

On termination of the extension of the first investigation in the manner just indicated, the entire code-analyzing process is arrested provided there are no code pulses being shifted through and processed in the register section B, as indicated by the reset state of third-investigation control binary 82. For this purpose the zero output line 970 from counter 97 and the reset output line of binary 82 are applied to the respective inputs of an AND-gate 98, and the output of this gate, which constitutes the aforementioned "Forget" command, is applied by way of an OR-gate 99 and over line 56, previously referred to, to the reset inputs of both binaries 50 and 51 of the memory circuit 4 (FIG. 5). The pulsewidth-memory counters 54 and 55 thereupon stop counting, and the code-processing operations are suspended, until such time as the binaries 50 and 51 are again switched to their set state by a fresh video pulse entering the channel.

Or-gate 99 has another input connected to the output of an AND-gate 910 having three inputs, respectively from the reset outputs of binaries 93 and 82 and from line $\overline{14} \cdot 15A$. It will be recognized that the conditions required to enable AND-gate 910 are identical with the group of conditions designated in Table I as "010" and identifying an isolated false-alarm pulse entering the line over a code-group period of 20.3 μs. and with register section B clear. In conformity with Table I, therefore, this set of conditions when satisfied also resets the memory binaries 50 and 51 through OR-gate 99 and line 56.

Second-investigation (check aside and ahead) circuit 9 (FIG. 10).—The function of this circuit is, in a first stage of the second investigation, to check the situation obtaining in both register sections of the alternative signal channel (i.e. in this instance register sections A' and B' of channel 1'); and in a second stage of said investigation to check conditions within the (20.3 μs.) code-group period preceding the code group being investigated, i.e. the situation in register section B into which the code group is progressing. The entire investigation commences at time 15, just after the code group being investigated has been fully entered in register section A, and continues through time 28 when said code group (except for its end framing pulse F2) is fully entered in section B.

The first stage of the investigation involves the determination of two conditions, namely whether or not pulses are present (1) in register section A' and (2) in register section B'. The significance of these conditions is the following. The presence of code pulses in register section A' (channel 1') at pulse time 14 (referred to the code group in channel 1) indicates a situation of the kind disclosed with reference to FIG. 2b, that is interleaved garble (GI); while the absence of such pulse indicates no interleaved garble (that is, either no garble $\overline{G}$ or phase-garble GPH). The presence of pulse in register section B' at said pulse time 14, simultaneously with the absence of any pulses in register section A', means that an earlier-received code group directed into channel 1' has been curtailed because the later code group being investigated in channel 1 is in phase-garbling, phase-leading relationship with said earlier code. The residual portion of the curtailed pulse group in channel 1' then appears as one or more false-alarm pulse in said channel. The situation is the one depicted in FIG. 2d, with code group 20 now representing the curtailed code pulses detected in channel 1', and code group 21 representing the code undergoing investigation in channel 1. Finally, if both register channels A' and B' are found clear of pulses, a garble-free situation obtains. The above situations are summarized in Table II–1, wherein the third column gives the "provisional conclusions" drawn inferred by the Second Investigation circuit, as a result of the first stage of the second investigation, at time 28. As will be disclosed later, these partial conclusions are combined in the circuit with other partial conclusions drawn from the second stage of the second investigation, and the resulting conclusions are issued as the output signals from the second-investigation circuit.

TABLE II-1

| At pulse time 14 (Ch. 1) | | Provisional Conclusion |
|---|---|---|
| Pulses in A' | Pulses in B' | |
| 0 | 0 | $\overline{G}$ |
| 0 | 1 | GPH |
| 1 | 0 | GI |
| 1 | 1 | GI |

FIG. 3a presents a graphic summary of the four situations described in Table II–1 designated by the corresponding four binary numbers. In situation 01, the dotted-line portion of the curtailed code group in channel 1' indicates the part of the code group treated as a series of false alarms.

The second, or "Check-Ahead," stage of the second investigation, from time 15 to 28, checks the situation in register section B (of the same channel, here 1, as the code group being investigated), and involves determination of three conditions. (1) Presence or not of a displaced (FARD) trailing pulse edge, (2) whether or not a prolongation decision (P) was taken during the First Investigation, and (3) whether or not a $15A \cdot 14B$ coincidence has occurred. The significance of this information is as follows:

Detection of a displaced trailing pulse edge (FARD) is taken as sufficient proof of phase garbling. The situation is then as depicted in FIG. 2c, where the code group being investigated in channel 1, represented by the code group 20 in FIG. 2c, is in phase-leading, phase-garbling relationship with a later code represented by code group 21. The detection of a $15A \cdot 14B$ coincidence at any time during the 15–28 period indicates the presence of an earlier code group ahead of the one being investigated. If there was no prolongation decision (P) during the first investigation of the code-group investigation, the presence of such earlier code group is immaterial and does not indicate garbling. If however there was a prolongation (P) decision, there is a strong presumption that the false-alarm pulse or pulses intervening between the two code groups are part of a third code group in completely overlapping, phase-garbling relation with the one under investigation. The various situations, and the corresponding partial-conclusion signals issued by the second discriminator circuit in response thereto, are summarized in Table II–2 and are graphically depicted in FIG. 3b, omitting for simplicity the four trivial situations in which a FARD situation is present.

TABLE II-2

| FARD | P | 15A·14B | Partial Conclusion (Time 28) |
|---|---|---|---|
| 0 | 0 | 0 | $\overline{G}$ |
| 0 | 0 | 1 | $\overline{G}$ |
| 0 | 1 | 0 | $\overline{G}$ |
| 0 | 1 | 1 | GPH |
| 1 | 0 | 0 | GPH |
| 1 | 0 | 1 | GPH |
| 1 | 1 | 0 | GPH |
| 1 | 1 | 1 | GPH |

In combining the partial conclusions arrived at in the first and second stages of the second investigation, the following rules are followed. A partial $\overline{G}$ conclusion in either stage is negated by a GI or a GPH conclusion in the other stage. A GI conclusion in the first stage is negated by a GPH conclusion in the second stage. A GPH conclusion in either stage entails a GPH conclusion for the over-all second investigation.

The conclusion signal delivered by the second-investigation circuit itself is not the final conclusion of the system, but may be termed semi-final. As later described, it will be combined with the partial-conclusion signal from the third investigation step according to rules similar to those just given, thereby to produce the final conclusion.

The second investigation circuit will now be described in detail. For memorizing the answers to the two questions involved in the first stage, there is provided a first group of two binaries 101, 102, and for memorizing the answers to the three questions involved in the second stage, there is provided the group of three binaries 103, 104, 105. Binaries 101 and 102 respectively memorize whether or not there are pulses (1) in register section A′, and (2) in section B′. Binaries 103, 104, 105 memorize respectively (1) the presence or absence of a FARD spike pulse, (2) the presence or absence of a previous P decision, and (3) the occurrence or non-occurrence of a 15A·14B coincidence. The binaries are controlled as follows.

Binaries 101 and 102 each have a setting input connected to the output of a related AND-gate 107, 108. One input to each of these gates is provided by the aforementioned 1A·15A line from register section A, which is energized at time 14 of the code being investigated as earlier described. The second input to each of the AND-gates 107, 108 is connected, respectively, to the set output of first-investigation binary 80′ of channel 1′ and to the set output of the second-investigation binary 81′ in said channel 1′. It will thus be evident that, at time 14, binary 101 is set, if binary 80′ is set thereby indicating the presence of a pulse in the A′ register section of channel 1′, and binary 102 is set if binary 81′ is set, thereby indicating the presence of a pulse in the B′ register section of channel 1′. Both binaries 101 and 102 have a reset input from line 15A·14B so as to be reset at time 28 which is the time of termination of the second investigation.

Binary 103 is set by the set output of a FARD-memorizing binary 1023. This latter binary has its setting input connected to line 512 leading from the memory circuit 4 (FIG. 5) and carrying the FARD spike pulses. Binary 1023 has its resetting input connected to the 1A·15A line. Thus, if there was an abnormally wide code pulse at any time during the preceding time period 1–14, the displaced trailing edge of such widened code pulse sets binary 1023 which thereupon sets binary 103, the latter remaining set throughout the second-investigation period after binary 1023 has been reset by the 1A·15A pulse at time 14.

Binary 104 has its setting input connected to the output of an AND-gate 1013 which has one input connected to the P output line from the first-investigation circuit 8 (FIG. 9) and another input connected to the $\overline{1A}$·15A line earlier referred to. Thus the decision to extend the first investigation (the P signal) is memorized as a set state in binary 104 at the first occurrence of a false-alarm coincidence $\overline{1A}$·15A.

Binary 105 has its setting input connected to the output of an AND-gate 1014 which has one input connected to the set output of binary 81 and its other input connected to the 15A·14B coincidence line. Binary 105 therefore is set on occurrence of any 15A·14B coincidence during the period 15–28, prior to termination of the second investigation.

All three "Check-Ahead" binaries 103, 104, 105 have their resetting inputs connected to the 15A·14B line so as to be reset simultaneously with the Check-Aside binaries on termination of the second investigation.

The various data thus stored in the five binaries 101–105 are now combined, in accordance with the logic earlier explained with references to Tables II–1 and II–2, so as to deliver on one of the output lines 1020, 1021, 1022 a partial (semi-final) conclusion signal $\overline{G}$ (no garble), GPH (phase-garble) or GI (intercalation garble), as said combined data may indicate.

The derivation of these output signals is best explained by writing the corresponding logical equations. The following symbolism will here be used: the set states of binaries 101, 102, 103, 104, 105 will respectively be designated by the symbols A′, B′, D, P, C; the reset states of the binaries will be designated by the corresponding symbols negated, i.e. $\overline{A'}$, $\overline{B'}$, etc.

In order that a final no-garble conclusion $\overline{G}$ may be elicited, it is necessary that each of the two stages of the second investigation lead to partial no-garble conclusions, and hence the equation for final $\overline{G}$ given by the logical product or intersection of the conditions given for the partial $\overline{G}$ conclusions in Tables II–1 and II–2:

$$G \text{ (final)} = \overline{A'} \cdot \overline{B'} \cdot \overline{D}(\overline{P} \cdot \overline{C} + \overline{P} \cdot C = P \cdot \overline{C})$$

Application of the elementary rules of Boolean algebra reduces this equation to:

$$G \text{ (final)} = \overline{A'} \cdot \overline{B'} \cdot \overline{D}(\overline{P} + P \cdot \overline{C})$$

The monomial factor $P\overline{C}$ is formed in the AND-gate 1016, the binomial factor in parentheses is formed in the OR-gate 1017, and both these factors together with the other three factors of the right-hand term of the equation, derived from the reset outputs of the appropriate binaries, are applied to the respective inputs of an AND-gate 1012 whose output thus represents the semi-final $\overline{G}$ conclusion signal.

The semi-final conclusion shall be GPH, the most unsatisfactory conclusion possible, if the partial conclusion in either of the two stages of the second investigation is GPH. A study of the Tables II–1 and II–2 shows that the equation for GPH (semi-final) can be written:

$$GPH \text{ (semi-final)} = \overline{A'} \cdot B' + P \cdot C + D$$

The monomial factor $\overline{A'} \cdot B$ is formed in AND-gate 1011, factor $P \cdot C$ in AND-gate 1015, and the outputs of both AND-gates together with the set output of binary 103 (representing factor D) are applied to the respective inputs of an OR-gate 1019 whose output 1021 thus delivers the semi-final GPH signal.

Lastly, the semi-final conclusion will be GI if this is the partial conclusion given by the first stage of the second investigation, provided this partial conclusion is not negated by a GPH partial-conclusion in the second stage. Tables II–1 and II–2 show that under these rules the equation for GPH will be $$GPH = A' \cdot \overline{D} \cdot (\overline{P} + P\overline{C})$$

The parenthetical factor derived from earlier-mentioned OR-gate 1017 is therefore applied to one input of an AND-gate 1018, and the other two factors A′ and $\overline{D}$ as derived from the appropriate binary outputs are applied to the other two inputs of the AND-gate. The output of AND-gate 1018 delivers the semi-final GI signal.

The semi-final conclusions from circuit 9 are memorized in the third-investigation circuit 10 and are combined with the partial conclusions derived in this latter circuit to yield the final conclusions of the system, as will be described.

Third-investigation ("check-beyond") circuit 10 (FIG. 11).—The function of this circuit is to check the pulse situation obtaining in the A register section of the channel under consideration from time 29 through time 42, in order to ascertain conditions during the code-group period (20.3 μs.) immediately following the code group being investigated.

The third investigation involves the determination of two items of information: (1) occurrence or non-occurrence of a $\overline{1A} \cdot 15A$ coincidence at any time during the third investigation period, and (2) the same for a $15A \cdot 14B$ coincidence. The occurrence of a $15A \cdot 14B$ coincidence indicates that a later code is present beyond the code being investigated, spaced less than one code period from it, and the occurrence of a $\overline{1A} \cdot 15A$ coincidence indicates a false-alarm pulse between the two codes. The simultaneous occurrence of both coincidences is strong proof that there is a third code group, in phase with and overlapping or straddling both first-mentioned two code groups, and hence phase-garbling the code being investigated, the situation being similar to the 011 situation of Table II–2. If the two above-specified coincidences are not both present, the conclusion is that no garbling is present. The situations are summarized in Table III, and are graphically presented in FIG. 3c. The lowermost section of this figure shows three different configurations liable to occur in the 11 situation and all leading to a phase-garbling conclusion.

TABLE III

| $\overline{1A} \cdot 15A$ | $15A \cdot 14B$ | Partial Conclusion (Time 42) |
| --- | --- | --- |
| 0 | 0 | $\overline{G}$ |
| 0 | 1 | $\overline{G}$ |
| 1 | 0 | $\overline{G}$ |
| 1 | 1 | GPH |

The third investigation circuit 10 will now be described in detail.

The two items of information $\overline{1A} \cdot 15A$ and $15A \cdot 14B$ are respectively memorized in the binaries 1112 and 1113, having their setting inputs connected to the outputs of related AND-gates 1114 and 1115. Both AND-gates have their first inputs connected to the set output of third-investigation binary 82, and have their second inputs connected, respectively, to the shift-register output lines carrying the $\overline{1A} \cdot 15A$ and $15A \cdot 14B$ coincidence information. Thus, should either of these two coincidences occur at any time throughout the third investigation period, the event will be recorded as a set state of binary 1112 or binary 1113 respectively. Both binaries are reset from the reset output of binary 82.

As will be evident from Table III, the equation for $\overline{G}$ (partial) can be written as the following equation, wherein E and H are the set states of binaries 1112 and 1113:

$$\overline{G} \text{ (partial)} = \overline{E} \cdot \overline{H} + \overline{E} \cdot H + E \cdot \overline{H}$$

which reduces to $$\overline{G} \text{ (partial)} = \overline{E} + \overline{H}$$

An equation is solved by the OR-gate 1117 having its inputs connected to the reset outputs of binaries 1112 and 1113.

The expression for partial GPH from Table III is simply $E \cdot H$ and is given at the output of an AND-gate 1116 having its inputs connected to the set outputs of said binaries.

As earlier said, the semi-final conclusions from circuit 9 are stored until such time as they are combined with the partial conclusions from circuit 10, derived as just described. For this purpose the three output lines 1020, 1021, 1022 from circuit 9 are applied to first inputs of three AND-gates 110, 111, 112, having their second inputs energized with the $15A \cdot 14B$ coincidence signal serving to set third-investigation binary 82. The outputs of the AND-gates serve to set respective intermediate-storage binaries 113, 114, 115. Thus, at the start of the third investigation period (as determined by the setting of binary 82), the semi-final $\overline{G}$, GPH and GI signals from circuit 9 are recorded as set states in binaries 113, 114, 115. These are merely intermediate-storage binaries, however, and three code pulse times (4.35 μs.) later the three binaries 113, 114, 115 are reset by a $b3$ pulse from counter 814 (see FIG. 8), which pulse simultaneously enables three AND-gates 116, 117, 118 to transfer the information contained in said intermediate-storage binaries to these permanent-storage binaries 1109, 1110, 1111. Owing to this two-step storage arrangement the second investigation circuit 9 is made capable of accepting fresh information in time to process a further code group following the first group by as little as one code-pulse time (1.45 μs.). The storage binaries 1109, 1110, 1111 are reset by the reset output from binary 82 on termination of the third investigation period.

The semi-final $\overline{G}$, GPH, GI signals appearing at the outputs of binaries 1109, 1110, 1111 are combined with the partial $\overline{G}$, GPH, GI signals derived during the third investigation period, according to the rules earlier specified, respectively in an AND-gate 1118, an OR-gate 1119 and an AND-gate 1120. As earlier explained, an AND-gate (1118) is required to combine the $\overline{G}$ signals because it is necessary for each of the investigation circuits to have separately reached a no-garble conclusion before a final no-garble conclusion can be drawn. On the other hand, a phase-garble conclusion GPH must be issued even if a single one of the investigation steps has pointed to such a conclusion; therefore an OR-gate (1119) is used to combine the GPH signals. As regards the interleaved-garble conclusion GI, this conclusion as derived from the second investigation can only be finalized if the third investigation has sensed a no-garble condition; hence the GI signal from binary 1111 is combined with the $\overline{G}$ signal from gate 1117 in an AND-gate 1120.

The final-conclusion signals appearing at the outputs of gates 1118, 1119, 1120 are applied to respective AND-gates 1121, 1122, 1123, which are simultaneously opened at code time 42 by the same signal that resets binary 82 to terminate the third investigation. The three final $\overline{G}$, GPH, GI signals, which constitute the output of the system, are passed from AND-gates 1121, 1122, 1123 to the decoder unit (not shown) simultaneously with the code to which the conclusions relate. The further utilization of these signals in the decoder lies beyond the scope of the present invention and it is sufficient to indicate that they serve to assign a so-called "validity number" to the decoded information, in a generally conventional manner.

The outputs of AND-gates 1121, 1122, 1123 are also applied to the inputs of an OR-gate 1124, whose output is applied to an AND-gate 1125 together with the reset outputs of the first- and second-investigation binaries 80 and 81. The output of AND-gate 1125 is connected to the previously mentioned "Forget"-command line 56. Thus the reading-out of an information signal from the system acts to disable the memorizing circuits by the resetting of the memory binaries 50 and 51 as earlier described.

X-situation circuit (FIG. 12).—For producing the X and X' signals referred to in an earlier section, two circuits are used, both similar to the one shown in FIG. 12 as producing the X signal relating to channel 1. The X-circuit comprises an X-binary 120 which is set on occurrence of a $1A \cdot 15A$ coincidence signal indicating that a code group has been registered in register section A. An AND-gate 121 receives at one input the set output from binary 120 and at its other input the reset output 76' from the memory-counter control binary 50' associated with channel 1'. The reset state of this binary indicates absence of code pulses throughout register 6' of channel 1'. The output of AND-gate 121 therefore yields the desired X signal.

The X' signal is derived from a circuit similar and symmetrical to the one just described, associated with channel 1'. The signals X and X' are combined in an OR-gate, not shown, to provide the $X+X'$ signal referred to above, and in a NOT-OR gate, not shown, to provide the $\overline{X+X'}$ signal.

SPI canceling circuit (FIG. 13).—The proper operation of the system as so far described would be disturbed by the presence of the so-called SPI pulse which, as earlier indicated, may form part of a secondary-radar response code group while being positioned three pulse periods, i.e. 4.35 μs., beyond the F2 framing pulse of the group. It should be distinctly understood that the system of the invention, as described up to this point, may very easily be modified so as to treat each code pulse group as though it were 24.65 μs. (rather than 20.30 μs.) long and thus make full allowance for the presence of an SPI pulse. This would simply require appropriately increasing the capacity of the registers and counters used, and correspondingly modifying some of the associated logical circuits, as will be readily accomplished by those familiar with the art. However, it is generally found satisfactory as disclosed herein to process the code groups as 20.3 μs. groups, i.e. disregard the SPI pulses, and provide special circuitry for canceling any spurious coincidences that may be due to such SPI pulses.

A spurious $1A \cdot 15A$ coincidence can occur between an SPI pulse of one code group, in position 15A, with a code pulse of a subsequent code group, in position 1A. Similarly a spurious $15A \cdot 14B$ coincidence can take place between an SPI pulse of one code group, in position 15A, and a code pulse of the same code group, in position 14B. In either case, the SPI pulse responsible for the spurious coincidence has reached position 15A three pulse periods (4.35 μs.) after the end framing pulse F2 of its related code group, or three pulse periods after inception of the Third Investigation Period, i.e. the setting of binary 82 (at time 31).

As shown in FIG. 13, the AND-gates 84 and 88 (referred to in connection with FIG. 8) used in the system are provided with blocking inputs indicated as semi-circular arrowheads. The blocking input of each AND-circuit is connected with the $b3$ output of the counter 814 which as earlier described commences a count at the instant binary 82 is set. Hence said AND-gates are prevented from being activated at this particular point, and are therefore unresponsive to the spurious coincidence.

A spurious $15A \cdot 14B$ coincidence may further be caused between the SPI pulse of one code group, present in position 14B, and a code pulse of a subsequent group, in position 15A. The SPI pulse responsible for such a coincidence reaches position 14B at time 45 of its code group cycle. Any suitable counting circuit may be used for detecting this period and disabling the AND-circuit 88 thereat. As shown, the $b14$ output from counter 814 (at period 42) is sampled with an $a$ (shift) pulse in AND-gate 130, and serves to set a binary 131 which thereupon enables an AND-gate 132 to pass $a$ shift pulses to a two-stage auxiliary counter 133, of capacity $2^2=4$. The third output $c3$ of this counter is seen to appear at the requisite pulse time 45, and is accordingly applied to the blocking input of AND-gate 88. The $c4$ output of counter 133 serves to clear the counter and reset binary 131.

The detailed description is thus completed. It will be seen that among the advantages of the embodiment disclosed is the fact that all the steps of the process are based on a method which involves the so-called sampling of the pulses by means of fine and accurately timed clock spike pulses, rather than on differentiation as has generally been the case in prior code-extractor systems. Errors due to short-term noise transients and the like are thus eliminated and the reliability and efficiency of the system considerably improved.

A great many modifications may be introduced into the embodiment disclosed without the exercise of further invention. Certain of such modifications may take the form of simplifications. Thus, the invention may be embodied in a single-channel rather than a two-channel system. It will still be capable of detecting false-alarms and garbled code groups, even though it will not be able to discriminate between all instances of phase-garbled signals or separate interleaved signals. Such a simplified code-extractor according to the invention may nonetheless have valuable uses in many cases. On the other hand, the teachings of the invention may be applied to more complex code-extractor systems having more than two channels.

The embodiment disclosed was designed for use with thirteen-positional code groups of the type recently specified for civil-aircraft transponders by the ICAO. The disclosed embodiment is applicable without change to the older type of radar code using only six pulse positions, since the new thirteen-position code was purposely devised by the ICAO so that the additional seven pulse positions therein are exactly situated at the midpoints of the intervals between the six pulse positions and framing pulses of the older code. Thus such an older code will be accepted and handled by the system disclosed herein just as if it were a thirteen-position code with seven of its pulse positions always blank.

With only minor modifications, the systems of the invention are also usable with other types of code, such as the codes used in the Mark X IFF and SIF systems; as well as other information-transmission codes (not necessarily radar codes) wherein the number and the timing characteristics of the pulse positions may differ greatly from the numerical values included in the present specification for the clarity of the disclosure.

What we claim is:

1. In a digital-code-extractor system having an input for receiving multiposition pulse codes, the combination comprising:

a spike generator responsive to the arrival of an initial code pulse at said input for producing two interleaved trains of equispaced first and second spikes substantially coincident with the leading and trailing edges, respectively, of a train of code pulses to be processed by the system;

test means for determining the substantial coincidence of the leading and trailing edges of subsequent code pulses with said first and second spikes, respectively;

output means controlled by said test means for further processing said code pulses upon such coincidence;

first circuit means responsive to noncoincidence of a leading edge with a first spike for inhibiting the further processing of the corresponding code pulse by said output means;

and second circuit means responsive to noncoincidence of a trailing edge with a second spike for generating an information signal.

2. The combination defined in claim 1 wherein said output means includes a shift register with enough stages to accommodate the pulses of a predetermined code, said register being responsive to shift pulses produced by said generator in the rhythm of said spikes for sequentially shifting successive code pulses through said stages.

3. The combination defined in claim 2 wherein said register includes a section with a first stage and a last stage for a pair of framing pulses invariably occurring at the beginning and the end of a code combination, further comprising third circuit means connected to said first and last stages for detecting a concurrent presence of said framing pulses in said register and for identifying a spurious signal in the absence of a pulse on either of said first and last stages a predetermined period after the response of said spike generator to said initial code pulse.

4. The combination defined in claim 1 wherein said spike generator comprises a digital counter with a counting cycle equal to the repetition period of said code pulses, said counter having separate stage outputs for delivering said first and second spikes.

5. In a digital-code-extractor system having an input for receiving multiposition pulse codes, the combination comprising:

circuitry forming a first and a second channel for the processing of pulse codes arriving substantially concurrently from different sources;

generator means responsive to the arrival of an initial code pulse at said input for producing a train of equispaced spikes substantially coincident with the leading edges of a train of code pulses to be processed by the system;

normally closed first and second gate means connected to said input for selectively directing code pulses into said first and second channels, respectively;

test means for determining the substantial coincidence of the leading edges of subsequent code pulses with said spikes and for maintaining said first gate means open upon said such coincidence;

circuit means responsive to noncoincidence of a leading edge with a spike from said generator means for closing said first gate means and opening said second gate means to direct a corresponding code pulse to said second channel; and first and second output means in said channels for individually processing the code pulses directed thereto.

6. The combination defined in claim 5 wherein said generator means comprises a first and a second spike generator, said test means comprising a first test circuit effective in the open state of said first gate means for comparing the leading edges of incoming code pulses with spikes from said first generator and a second test circuit effective in the open state of said second gate means for comparing the leading edges of incoming code pulses with spikes from said second generator, said second test means being operative in response to a noncoincidence between the last-mentioned leading edges and spikes for reclosing said second gate means and reopening said first gate means.

7. The combination defined in claim 6 wherein each of said generators includes means for producing interleaved trains of first and second spikes respectively timed for substantial coincidence with leading and trailing edges of code pulses in codes headed by initial pulses respectively allocated to said first and second channels, said first test circuit being triggerable by said first generator to close and reopen said first gate means with concurrent opening and reclosing of said second gate means in the rhythm of the first and second spikes from said first generator, said second test circuit being triggerable by said second generator to close and reopen said second gate means with concurrent opening and reclosure of said first gate means in the rhythm of the joint and second spikes from said second generator.

8. The combination defined in claim 7 wherein said second spikes are timed to occur with a slight lag relative to the trailing edges of corresponding code pulses, said first and second test circuits being triggerable by the trailing edges of the code pulses in the corresponding channels to reverse the open and closed states of said first and second gate means and being similarly triggerable by the second spikes from the corresponding generators in the absence of an immediately preceding trailing edge.

9. The combination defined in claim 8 wherein said first spikes from said first and second generators are timed to occur with a slight lead relative to the leading edges of code pulses in the corresponding channels.

10. The combination defined in claim 9 wherein said generators comprise digital counters each with a counting cycle equal to the repetition period of said code pulses, said counters having separate stage outputs for delivering said first and second spikes.

11. The combination defined in claim 7 wherein said test means further comprises circuit means responsive to an out-of-phase relationship between the second spikes from either of said generators and the trailing edge of a code pulse in the corresponding channel for generating an information signal.

12. The combination defined in claim 7 wherein said first and second output means include respective shift registers with enough stages to accommodate the pulses of a predetermined code, said registers being responsive to shift pulses produced by the corresponding generators in the rhythm of said spikes thereof for sequentially shifting successive code pulses through said stages.

13. The combination defined in claim 12 wherein each of said registers is divided into two cascaded sections each having a sufficient number of stages to accommodate all the significant pulses of said code, the first of said sections having a first stage and a last stage for a pair of framing pulses invariably occurring at the beginning and the end of a code combination, further comprising coincidence means connected to said first and last stages for detecting a concurrent presence of said framing pulses in said first of said sections and for blocking the progress of said code pulses to the stages of the second of said sections in the absence of a pulse on either of said first and last stages a predetermined period after the response of the corresponding generator to an initial code pulse.

14. The combination defined in claim 13, further comprising logical investigating means connected to said registers for ascertaining the concurrent presence of code pulses in more than one section of said first and second registers and for generating discriminatory signals in response to such presence.

15. The combination defined in claim 14 wherein said test means further comprises a selector controlled by said first and second test circuits for giving priority to said first channel by periodically closing and reopening said first gate means, in the rhythm of the spikes from said first generator, until occurrence of a code pulse having a leading edge substantially out of phase with a first spike from said first generator, and for switching said priority to said second channel in response to such out-of-phase relationship, with periodic closing and reopening of said second gate means in the rhythm of the spikes from said second generator, until recurrence of a code pulse having a leading edge substantially out of phase with a first spike of said second generator.

16. The combination defined in claim 15, further comprising deactivating means for said generators controlled by a cancellation signal from said investigating means, said selector being operative upon deactivation of said generators to give initial priority to one of said channels by opening one of said gate means, each of said generators being provided with activating means in the corresponding channel responsive to the arrival of an initial code pulse.

17. The combination defined in claim 16 wherein said selector is operative to hold both said gate means initially open in response to a predetermined signal from said investigating means indicative of the presence of pulses from a previously received code group in the register of one of said channels, said test means determining the phase relationship between a newly arriving code pulse and said previously received code group for closing the gate means of the other channel in the presence of correct relative phasing.

18. The combination defined in claim 13 wherein each of said registers also includes a buffer register connected to receive said significant pulses from the second one of said sections upon reception of a complete code group in said second one of said sections.

References Cited

UNITED STATES PATENTS

| 2,975,366 | 3/1961 | Young | 328—111 XR |
| 2,975,404 | 3/1961 | Kups | 328—119 XR |
| 3,040,260 | 6/1962 | Nichols | 328—110 |
| 3,372,375 | 3/1968 | Lem | 328—108 XR |

DONALD J. YUSKO, Primary Examiner

U.S. Cl. X.R.

328—110